(12) United States Patent
Iwamura et al.

(10) Patent No.: US 9,521,297 B2
(45) Date of Patent: Dec. 13, 2016

(54) REFERENCE COLOR SELECTION DEVICE, COLOR CORRECTION DEVICE, AND REFERENCE COLOR SELECTION METHOD

(71) Applicant: FUJITSU LIMITED, Kawasaki-shi, Kanagawa (JP)

(72) Inventors: Yasumasa Iwamura, Akashi (JP); Masayoshi Shimizu, Hadano (JP); Akihiro Minagawa, Tachikawa (JP); Yusuke Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/750,135

(22) Filed: Jun. 25, 2015

(65) Prior Publication Data
US 2016/0006904 A1  Jan. 7, 2016

(30) Foreign Application Priority Data
Jul. 7, 2014   (JP) ................... 2014-139939

(51) Int. Cl.
*G06K 9/00* (2006.01)
*G03F 3/08* (2006.01)
*H04N 1/60* (2006.01)
*G06T 7/00* (2006.01)

(52) U.S. Cl.
CPC ............. *H04N 1/6027* (2013.01); *G06T 7/00* (2013.01); *H04N 1/6033* (2013.01); *H04N 1/6086* (2013.01); *G06T 2207/10004* (2013.01); *G06T 2207/10024* (2013.01)

(58) Field of Classification Search
CPC .. H04N 1/6027; H04N 1/6033; H04H 1/6086; G06T 7/00; G06T 2207/10004; G06T 2207/10024

USPC .................................................. 382/167, 518
See application file for complete search history.

(56) References Cited

U.S. PATENT DOCUMENTS

| 7,961,352 B2* | 6/2011 | Kaneko ................. H04N 1/603 358/1.9 |
|---|---|---|
| 2004/0201766 A1* | 10/2004 | Funston ............... H04N 5/2351 348/333.02 |
| 2007/0165254 A1 | 7/2007 | Kuriyama et al. |
| 2013/0250322 A1* | 9/2013 | Kawabata ................ H04N 1/60 358/1.9 |

FOREIGN PATENT DOCUMENTS

| JP | 10-70669 | 3/1998 |
|---|---|---|
| JP | 2003-149050 | 5/2003 |
| JP | 2007-188128 | 7/2007 |

* cited by examiner

*Primary Examiner* — Kanjibhai Patel
(74) *Attorney, Agent, or Firm* — Staas & Halsey LLP

(57) ABSTRACT

A reference color selection device includes a determination unit that compares a first and second magnitudes of a first second candidate colors with respect plural wavelengths and determines whether or not there is any wavelength that provides a reverse magnitude relationship between the first and second magnitudes reverse to a magnitude relationship at other wavelengths, the first and second candidate colors being included in a color group of reference colors used in color correction of a target color; and a selection unit that selects the color group as the reference colors when there is not a combination of the first and second candidate colors about which the determination unit determines that there is the wavelength that provides the reverse magnitude relationship in the color group to be the candidates of the reference colors.

20 Claims, 33 Drawing Sheets

COLOR PATCH
(ENLARGED VIEW OF PATCH PORTION)

| LIGHT SOURCE | FLUORESCENT LIGHT | | INCANDESCENT LIGHT | | SUNLIGHT | |
|---|---|---|---|---|---|---|
| DISTANCE OF REFERENCE COLOR | CLOSE | FAR | CLOSE | FAR | CLOSE | FAR |
| TARGET COLOR G1 | LARGE | MEDIUM | LARGE | MEDIUM | SMALL | SMALL |
| TARGET COLOR G2 | SMALL | MEDIUM | MEDIUM | LARGE | SMALL | SMALL |
| TARGET COLOR G3 | MEDIUM | LARGE | SMALL | LARGE | SMALL | SMALL |

SELECTION BY RELATED ART

FIG. 15

| REFERENCE COLOR NUMBER | REFERENCE COLOR (R, G, B) |
|---|---|
| 1 | 80, 80, 80 |
| 2 | 80, 160, 160 |
| ⋮ | ⋮ |
| M | ⋮ |

FIG. 16

| TABLE NUMBER | FIRST REFERENCE COLOR NUMBER | SECOND REFERENCE COLOR NUMBER | REJECTION WAVELENGTH |
|---|---|---|---|
| 1 | 2 | 5 | 550 |
| ⋮ | ⋮ | ⋮ | ⋮ |
| M | 6 | 9 | 700 |

FIG. 31

| SAMPLE COLOR | TABLE NUMBER | FIRST REFERENCE COLOR NUMBER | SECOND REFERENCE COLOR NUMBER | REJECTION WAVELENGTH |
|---|---|---|---|---|
| (0, 0, 0) | 1 | 2 | 3 | 550 |
| | ⋮ | ⋮ | ⋮ | ⋮ |
| | M0 | 7 | 8 | 670 |
| (20, 20, 20) | 1 | 1 | 2 | 700 |
| | ⋮ | ⋮ | ⋮ | ⋮ |
| | M1 | 6 | 8 | 600 |
| (20, 40, 40) | 1 | 1 | 2 | 700 |

REFERENCE COLOR REJECTION TABLE

| SAMPLE COLOR | TABLE NUMBER | FIRST REFERENCE COLOR NUMBER | SECOND REFERENCE COLOR NUMBER | REJECTION WAVELENGTH |
|---|---|---|---|---|
| (100, 150, 200) | 1 | 2 | 3 | 550 |
| | ⋮ | ⋮ | ⋮ | ⋮ |
| | M0 | 7 | 8 | 670 |
| (150, 150, 200) | 1 | 1 | 2 | 700 |
| | ⋮ | ⋮ | ⋮ | ⋮ |
| | M1 | 6 | 8 | 600 |
| (200, 200, 200) | 1 | 1 | 2 | 700 |

OPTIMAL COMBINATION TABLE

| TABLE NUMBER | SAMPLE COLOR | OPTIMAL REFERENCE COLOR NUMBER | OPTIMAL REFERENCE COLOR NUMBER | OPTIMAL REFERENCE COLOR NUMBER | OPTIMAL REFERENCE COLOR NUMBER |
|---|---|---|---|---|---|
| 1 | 100, 150, 200 | 1 | 2 | 5 | 4 |
| 2 | 150, 150, 200 | 1 | 2 | 3 | 5 |
| ⋮ | ⋮ | ⋮ | ⋮ | ⋮ | ⋮ |
| N | | 1 | 6 | 9 | 8 |

REFERENCE COLOR SELECTION DEVICE, COLOR CORRECTION DEVICE, AND REFERENCE COLOR SELECTION METHOD

CROSS-REFERENCE TO RELATED APPLICATION

This application is based upon and claims the benefit of priority of the prior Japanese Patent Application No. 2014-139939, filed on Jul. 7, 2014, the entire contents of which are incorporated herein by reference.

FIELD

The embodiments discussed herein are related to a reference color selection device, a color correction device, and a reference color selection method.

BACKGROUND

In recent years, there is a demand for easy measurement of colors without using dedicated measurement apparatuses such as an expensive spectrophotometer and a colorimeter. As for the demand, recent digital cameras have been becoming more reasonable, are capable of obtaining the colors of a target object as gray levels (hereinafter referred to as "color value") in the R (red) G (green) B (blue) color space, and may thus be used for color measurement at a low cost.

However, the color tone of an image photographed by the digital camera often differs from the original color tone due to the influence of light such as illumination light or sunlight under the photographing environment. Thus, it is difficult to stably perform color measurement.

Accordingly, in a case where the color tone of the photographed image differs from the original color tone, color correction may be performed in which the colors of pixels in the image are converted into the original colors.

In a common method for performing color correction, known colors (hereinafter referred to as "reference color") are simultaneously photographed with the target object, and true colors of pixels of an input image are obtained by using color changes of the reference colors.

In general, all pixel values of the input image may not be provided beforehand as the reference colors. Thus, conversion amounts of input colors are calculated from plural reference colors, and the color correction is thereby performed. That is, the colors of input pixels are corrected by performing interpolation in the color space.

As related art about such a kind of color correction, a technology has been suggested in which control signals of an output device for the input signals in the input color space are obtained by interpolation between preset vertex output values of respective color separation components that are set to the vertices in the input color space which are divided into plural solid figures. In this technology, the reference colors are set such that finer division is performed for areas in the color space that are important in expression and for the color spaces with high frequencies in order to reduce non-linear errors that occur in volume interpolation and linear interpolation.

Japanese Laid-open Patent Publication No. 10-70669 is an example of related art.

SUMMARY

According to an aspect of the invention, a reference color selection device includes a determination unit that compares a first magnitude of a first candidate color and a second magnitude of a second candidate color with respect plural wavelengths and determines whether or not there is any wavelength that provides a reverse magnitude relationship between the first and second magnitudes reverse to a magnitude relationship at other wavelengths, the first and second candidate colors being included in a color group to be candidates of plural reference colors that are used in color correction of a target color, the color correction being performed by an interpolation process by using the plural reference colors; and a selection unit that selects the color group as the reference colors when there is not a combination of the first candidate color and the second candidate color about which the determination unit determines that there is the wavelength that provides the reverse magnitude relationship in the color group to be the candidates of the reference colors.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a chart that illustrates one example of a reference color table;

FIG. 16 is a chart that illustrates one example of a reference color rejection table according to the first embodiment;

FIG. 31 is a chart that illustrates one example of the reference color rejection table according to the second embodiment;

DESCRIPTION OF EMBODIMENTS

Incidentally, in color correction in related art, there is a technology in which a color patch having the larger number of reference colors than the number of the reference colors that are actually used in the color correction is simultaneously photographed with the target object of the color measurement, preferable reference colors are selected from the plural reference colors, and the color correction of the target object is thereby performed.

Figure 42:
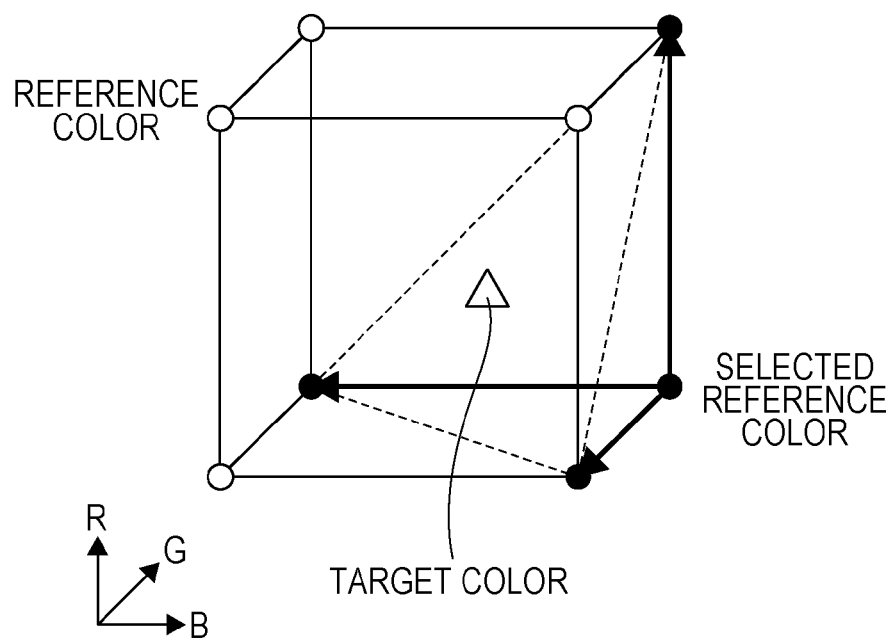
FIG. 42 is a perspective diagram of a color space for explaining a case where a close color to the target color in the color space is selected.

As described above, in a case where the reference colors that are actually used in the color correction are selected from the color patch having plural colors as the reference colors, as illustrated in FIG. 42 as one example, the reference color that is close to the color as the target of the color correction (hereinafter referred to as "target color") in the color space is typically selected. Such a method of selecting the color that is close to the target color in the color space as the reference color may be considered as a valid method because using the reference color close to the target color typically reduces the error that occurs due to interpolation when interpolation computation is performed.

However, as a result of study of the inventors of the disclosed technology, it is found that there is a case where more accurate color correction is enabled by rather selecting a farther color as the reference color than selecting a closer color to the target color in the color space.

Accordingly, the related art in which the reference color close to the target color in the color space is regularly selected does not necessarily realize appropriate approximation of the target color to the original color.

It is desirable to realize selection of reference colors that enable color correction in which the colors of a color image obtained by photographing may be approximated to the original colors while the influence of light in the photographing is reduced.

Embodiments of the disclosed technology will hereinafter be described in detail with reference to drawings.

[First Embodiment]

Figure 1:
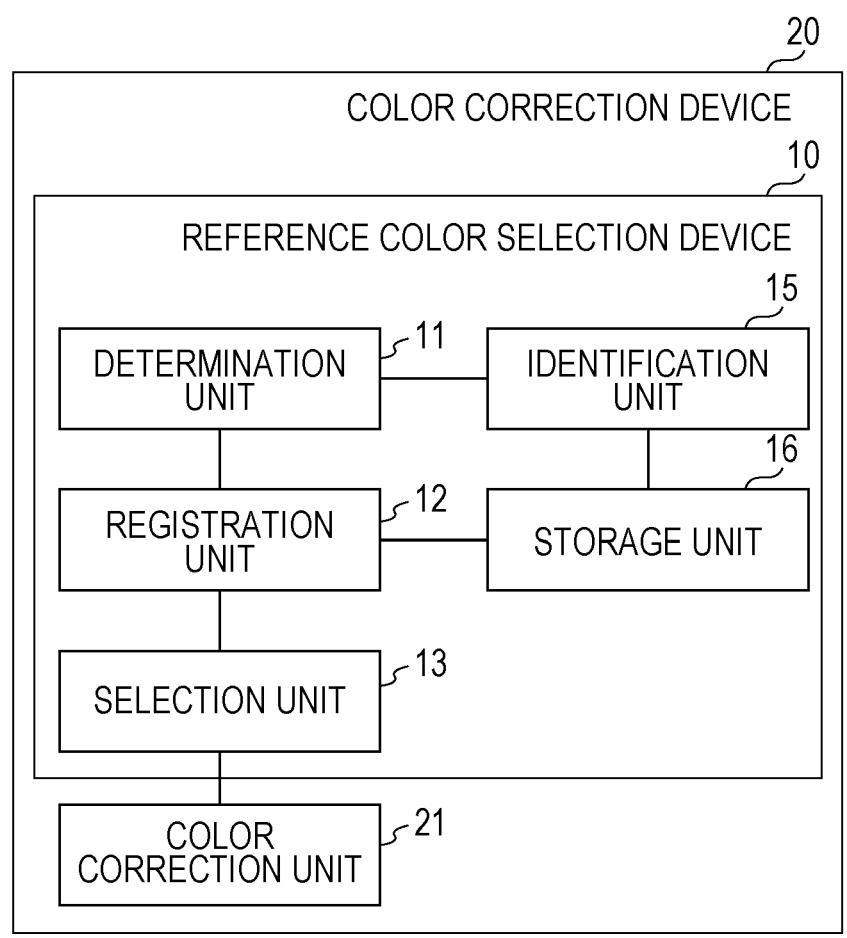
FIG. 1 is a function block diagram of a color correction device according to a first embodiment.

FIG. 1 illustrates a reference color selection device 10 and a color correction device 20 according to this embodiment. As illustrated in FIG. 1, the reference color selection device 10 according to this embodiment includes a determination unit 11, a registration unit 12, a selection unit 13, an identification unit 15, and a storage unit 16. Further, the color correction device 20 includes the reference color selection device 10 and a color correction unit 21.

The determination unit 11 compares the magnitude relationships between the color intensities of first candidate colors and the color intensities of second candidate colors with respect to plural wavelengths for a color group to be candidates of plural reference colors that are used in a case where color correction to a target color as a target of the color correction is performed by an interpolation process by using the plural reference colors. The determination unit 11 then determines whether or not there is any wavelength that provides the reverse magnitude relationship to the magnitude relationships between the other wavelengths. In this embodiment, the spectral reflection intensity is employed as the color intensity, but the color intensity is not limited to this. For example, instead of the spectral reflection intensity, another value that indicates the color intensity such as spectral reflectance (energy per unit time) may be employed.

Meanwhile, the storage unit 16 in advance stores first characteristic information that indicates the spectral reflection characteristics of same type colors as the target color and second characteristic information that indicates the spectral reflection characteristics of the color group to be the candidates of the reference colors. Further, the identification unit 15 identifies the wavelengths that are mainly featured (hereinafter referred to as "main wavelength") from the spectral reflection characteristics of the same type colors, which are indicated by the first characteristic information.

The determination unit 11 according to this embodiment determines whether or not there is the wavelength that provides the reverse magnitude relationship about the spectral reflection characteristics indicated by the second characteristic information with respect to the wavelength identified by the identification unit 15 as the target.

Meanwhile, in a case where the determination unit 11 determines that there is the wavelength that provides the reverse magnitude relationship, the registration unit 12 registers the information that indicates the combination of the first candidate color and the second candidate color as the targets of the determination as rejection information that rejects the combination from the reference colors to be used in the color correction (a reference color rejection table, which will be described below). The selection unit 13 then refers to the rejection information that is registered by the registration unit 12 and thereby selects the color group to be the candidates of the reference colors, in which there is not the combination of the first candidate color and the second candidate color that are indicated by the rejection information, as the reference colors.

Further, the color correction unit 21 performs color correction to the target color by the interpolation process by using the reference colors selected by the selection unit 13. The color correction unit 21 according to this embodiment performs the color correction to the target color by the interpolation process based on color information of the colors of the color group and the target color that are obtained by capturing an image of the color patch in which the colors of the color group to be the candidates of the reference colors are arranged and a target object and color information that indicates the original colors of the colors of the color group. In this embodiment, color values of the above-described RGB color space are employed as the color information, but the color information is not limited to those. For example, color values of another color space such as the L*a*b* color space, the XYZ color space, or the CMY color space may be employed as the color information.

Figure 2:
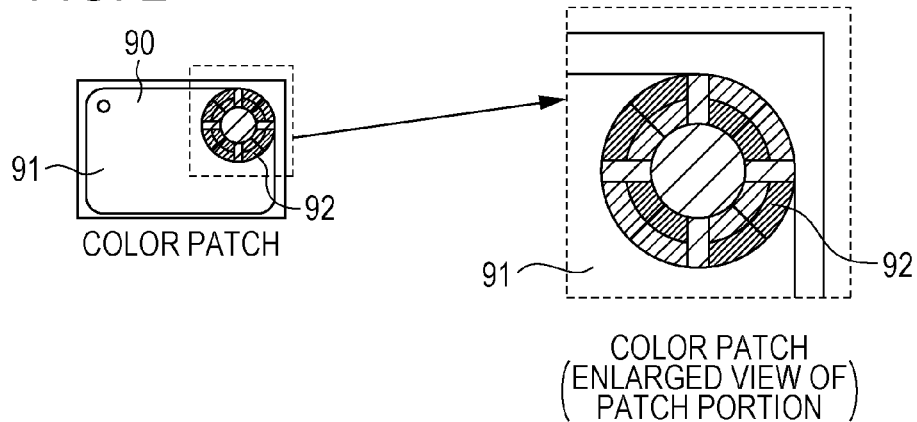
FIG. 2 is an external view that illustrates one example of a color patch.
Figure 3:
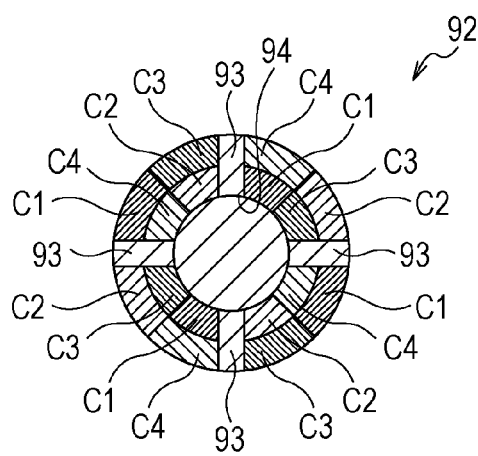
FIG. 3 is a front view for explaining a configuration of the color patch.

Here, the color correction by the color correction unit 21 according to this embodiment will be described. The color patch used in the color correction will first be described. In the color correction according to this embodiment, four reference colors are used as described below, and the color patch on which eight reference colors are arranged is used. However, here, for a simple and clear description, a description will be made about a color patch 90 which is illustrated in FIGS. 2 and 3 as one example and in which four reference colors are arranged. Thus, a description will not be made here about selection of the reference colors to be used in the color correction from the reference colors provided in the color patch, and the selection will be described in detail later.

As illustrated in FIG. 2, the color patch 90 is in a thin plate shape, includes a patch portion 92 that is integrally provided on a support body 91, and is substantially in a rectangular shape in a front view.

As illustrated in FIG. 3, the patch portion 92 is in an annular shape that is provided with a circular opening 94 in a central portion and is split into plural split areas (four areas in the example illustrated in FIG. 3) by plural division areas 93 that are radially provided around the center of the annular shape. Further, all four reference colors C1 to C4 that are same type colors as the target color in the target object are arranged in each of the split areas of the patch portion 92.

Figure 4:
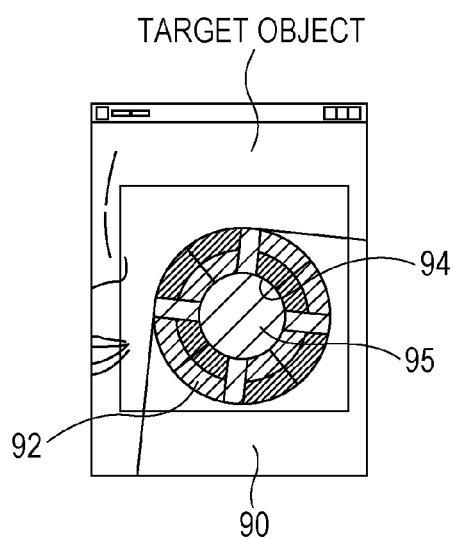
FIG. 4 is a diagram that illustrates an example of use of the color patch.

In this embodiment, as illustrated in FIG. 4 as one example, when the target object is photographed by a digital camera, the color patch 90 is pressed onto the target object such that the area (hereinafter referred to as "target area") 95 in the target object to be the target of the color correction is positioned inside the opening 94. In this embodiment, as illustrated in FIG. 4, the face of a person is employed as the target object, and a cheek area of the face is employed as the target area 95. Thus, the color patch 90 employs four colors among human skin colors as the reference colors C1 to C4.

Further, as illustrated in FIG. 3, the patch portion 92 is configured with the four reference colors C1 to C4 such that two color lines in each of which a pair of different colors are aligned in the circumferential direction are aligned in the radial direction. One of the color lines is arranged to be positioned alternately in the inside area and the outside area along the circumferential direction. The other color lines is arranged to be positioned alternately in the outside area and the inside area along the circumferential direction, oppositely to the alignment of the one color line. This arrangement of the reference colors enables reduction in the influence of uneven brightness in the patch portion 92 that is caused by the inclination of the color patch 90 with respect to the photographing direction of the digital camera during photographing by the digital camera.

A procedure of a color correction process according to this embodiment will next be described.

First, as a first stage, the color values of the reference colors C1 to C4 in the color patch 90 are measured by a spectrophotometer prior to photographing of the target object. Accordingly, the color values of the reference colors C1 to C4 may be obtained with high accuracy at this stage.

Next, as a second stage, the patch portion 92 of the color patch 90 and the target area 95 are photographed by the digital camera so that those fall within the angle of view in a state where the color patch 90 is pressed onto the target object so that the target area 95 is positioned in the opening 94 as described above.

Next, as a third stage, the color values of the reference colors C1 to C4 of the color patch 90 and the target area 95 are extracted from color image data obtained by photographing. In this embodiment, as the color values of the reference colors C1 to C4, the average value of the color value of each of R, G, and B is calculated for each of the reference colors C1 to C4 in all disposition areas of the reference colors of the patch portion 92 of the color patch 90. Further, in this embodiment, the color value of each of R, G, and B of each pixel in the target area 95 is used as the color values of the target area 95, and the average value of the color values of each of R, G, and B is calculated for the whole target area 95.

Next, as a fourth stage, the color value of the reference color C1, calculated in the third stage, is set as V1. The vector from the color value of the reference color C1 to the color value of the reference color C2 in the color space is set as vector a1. The color values are the ones calculated at the third stage. Similarly, the vector from the color value of the reference color C1 to the color value of the reference color C3 in the color space is set as vector b1, and the vector from the color value of the reference color C1 to the color value of the reference color C4 in the color space is set as vector c1. The color values of the reference colors C1 to C4 are the ones calculated at the third stage. Further, as illustrated on the left side of FIG. 5, the vector from the color value V1 of the reference color C1 to a color value T1 of the target area 95 in the color space is expressed by the weighted sum of three vectors a1, b1, and c1, which is expressed by the following equation (1). Then, weighting coefficients W1 to W3 in this case are calculated backward from the color values that are calculated at the third stage.

$$T1 = V1 + W1 \times \vec{a1} + W2 \times \vec{b1} + W3 \times \vec{c1} \quad (1)$$

Figure 5:
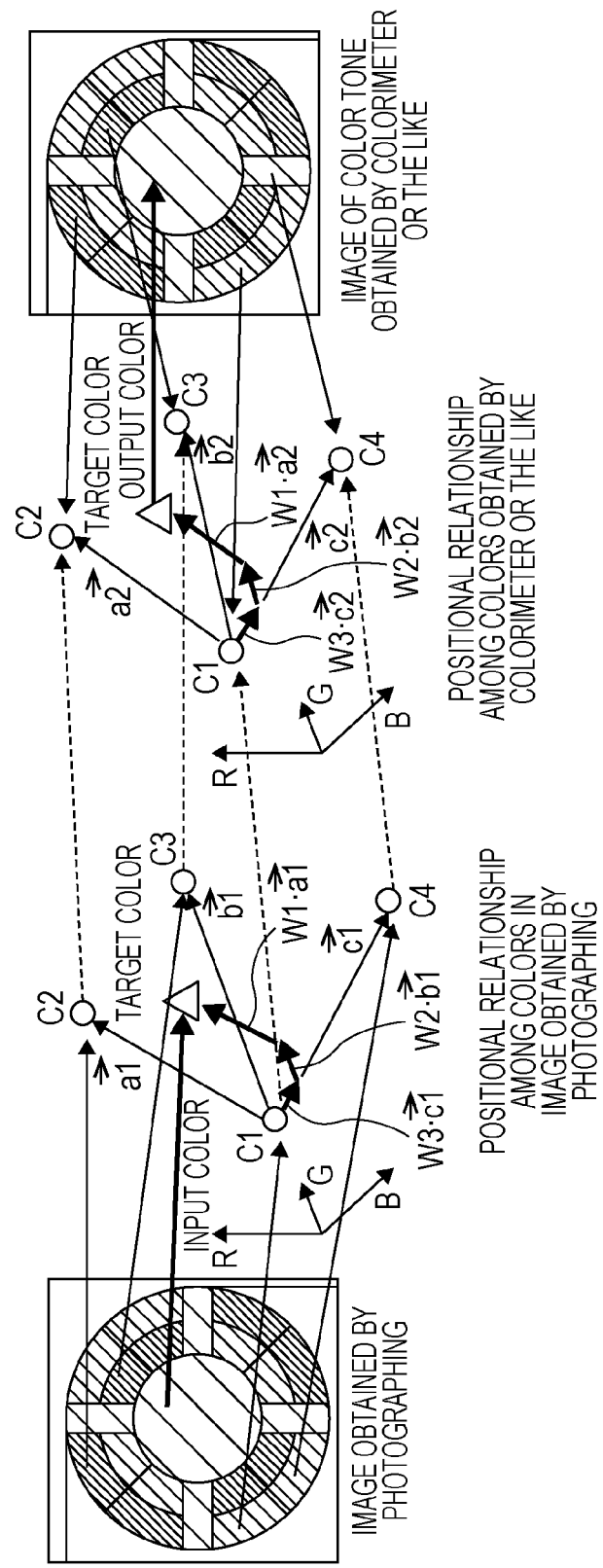
FIG. 5 is a schematic diagram for explaining a color correction process.

Next, as a fifth stage, as illustrated on the right side of FIG. 5, a corrected color value T2 of the target area 95 is calculated by the following equation (2) based on weighting coefficients W1 to W3 obtained by the above process and the color values of the reference colors C1 to C4 that are beforehand measured at the first stage. A value V2 in equation (2) is the color value of the reference color C1 that is measured at the first stage, and vector a2 is the vector from the color value of the reference color C1 to the color value of the reference color C2 in the color space. The color values are the ones that are obtained by the measurement at the first stage. Similarly, vector b2 is the vector from the color value of the reference color C1 to the color value of the reference color C3 in the color space, and vector c2 is the vector from the color value of the reference color C1 to the color value of the reference color C4 in the color space. The color values are the ones that are obtained by the measurement at the first stage.

$$T2 = V2 + W1 \times \vec{a2} + W2 \times \vec{b2} + W3 \times \vec{c2} \quad (2)$$

Finally, as a sixth stage, the color values of the pixels that correspond to the target area 95 in the color image data obtained by photographing are converted so that the color of the target area 95 becomes the color of the color value T2 obtained by the above process.

Figure 6:
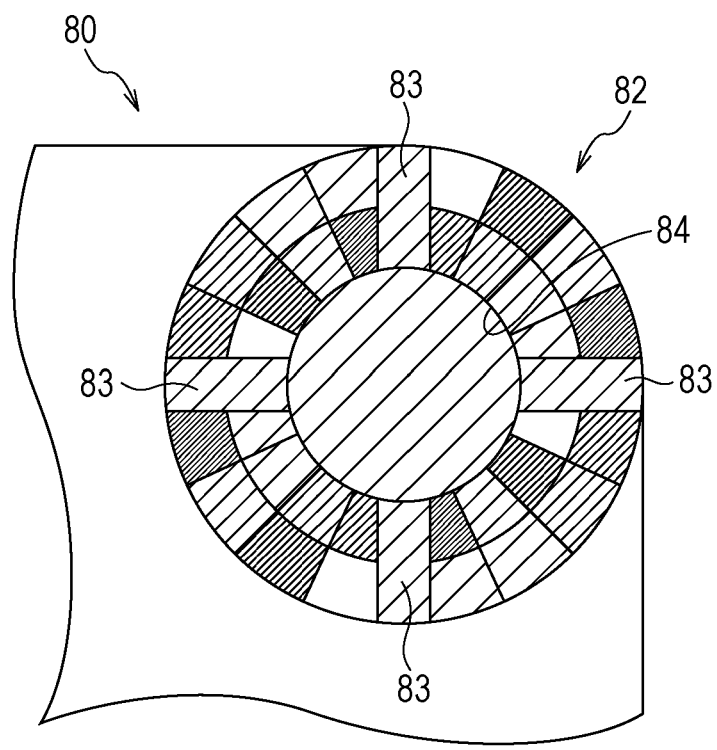
FIG. 6 is a front view that illustrates a configuration example of a color patch according to an embodiment.

In the color correction according to this embodiment, a color patch 80 which is illustrated in FIG. 6 as an example and in which eight reference colors are aligned is used. In FIG. 6, for convenience, the same reference color is indicated by the same pattern.

In the color patch 80, similarly to the color patch 90, a patch portion 82 is in an annular shape that is provided with a circular opening 84 in a central portion and is split into plural split areas (four areas in the example illustrated in FIG. 6) by plural division areas 83 that are radially provided around the center of the annular shape. Further, all eight reference colors that are same type colors (colors among human skin colors in this embodiment) as the target color in the target object are arranged in each of the split areas of the patch portion 82.

Further, as illustrated in FIG. 6, the patch portion 82 is configured with the eight reference colors such that two color lines in each of which pairs of different colors are aligned in the circumferential direction are aligned in the radial direction. One of the color lines is arranged to be positioned alternately in the inside area and the outside area along the circumferential direction. The other color lines is arranged to be positioned alternately in the outside area and the inside area along the circumferential direction, oppositely to the alignment of the one color line.

As described above, in this embodiment, the color patch 80 in which eight reference colors are aligned is used. However, the color patch is not limited to this. In this embodiment, as described above, the color correction to the target color is performed by using four reference colors. Thus, any color patch may be employed as long as five or more reference colors are arranged therein.

Incidentally, in related art, in a case where the reference colors that are actually used in the color correction are selected from a color group to be the candidates of plural reference colors, that is, from a reference color group provided in the color patch, as illustrated in FIG. 42 as one example, the reference color that is close to the target color in the RGB color space is selected. A method of selecting the reference color that is close to the target color in the color space may be considered to be a seemingly valid method because using a reference value close to a target value of the interpolation process typically reduces the error that occurs when interpolation computation is performed.

However, as a result of study by the inventors, it is found that there is a case where the method of selecting the reference color close to the target color in the color space results in a large error between the corrected color and the original color depending on the combination of the target color and the reference color.

That is, the inventors performed simulations of the color correction according to this embodiment in two cases that are a case where the closest reference colors to the target colors in the RGB color space were selected with respect to plural target colors and a case where the farthest reference colors from the target colors were selected. Here, three kinds of colors among human skin colors were employed as the target colors, and three kinds of light sources of a fluorescent light, an incandescent light, and sunlight were employed as the light sources during photographing by the digital camera.

Figure 7:
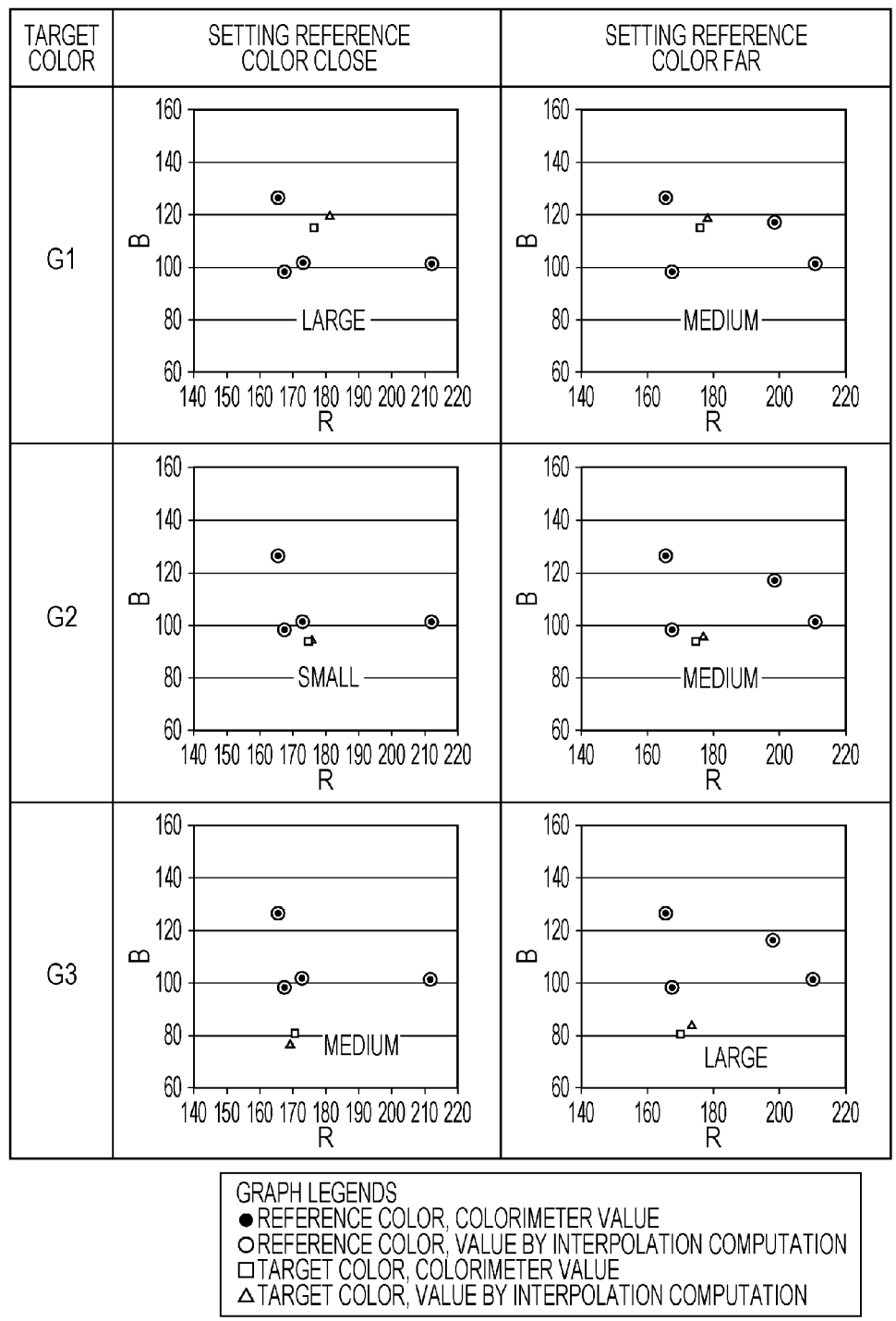
FIG. 7 is graphs that represent examples of interpolation errors in a case where an interpolation process is performed for target colors and reference colors when a light source is a fluorescent light.
Figure 8:
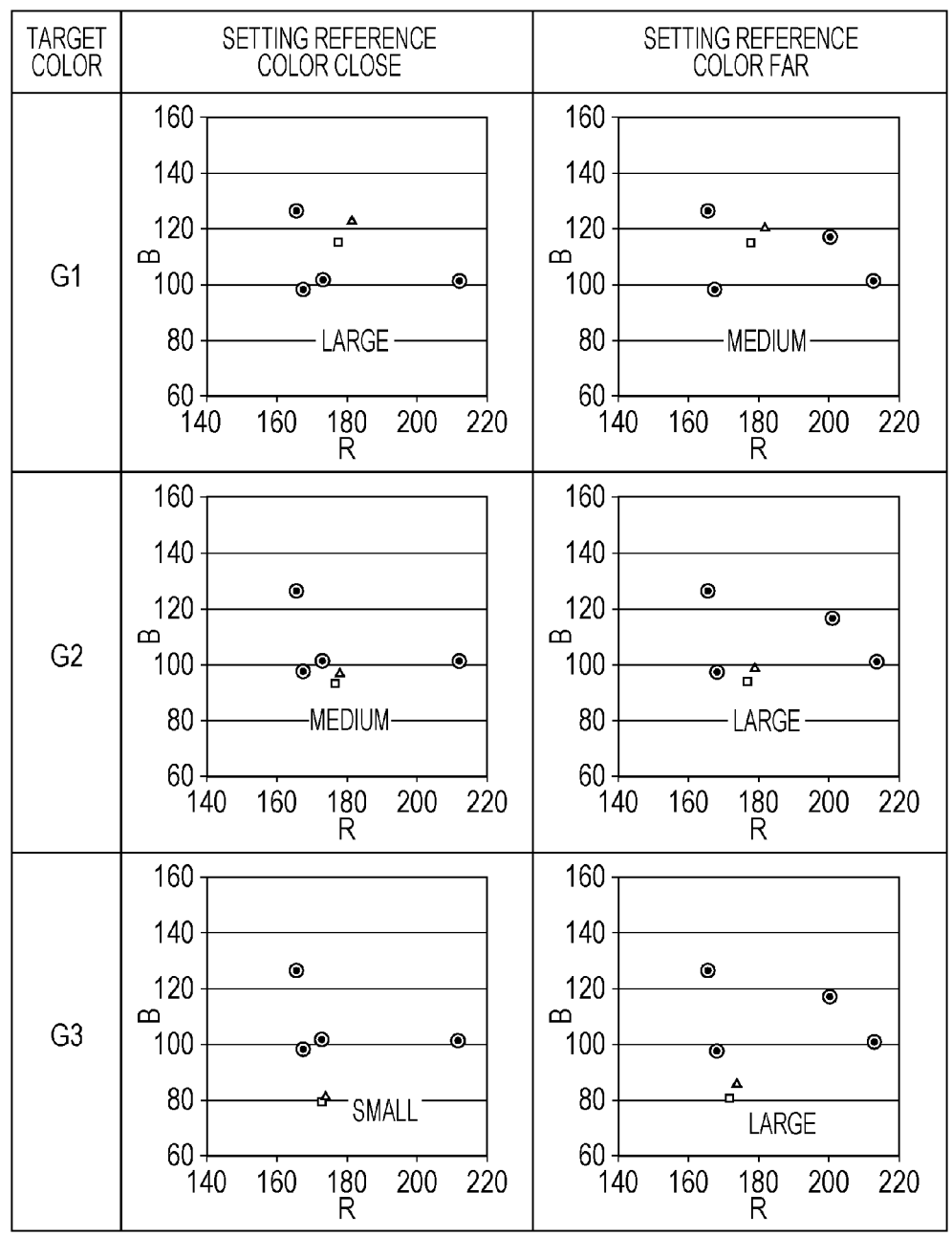
FIG. 8 is graphs that represent examples of interpolation errors in a case where the interpolation process is performed for the target colors and the reference colors when the light source is an incandescent light.
Figure 9:
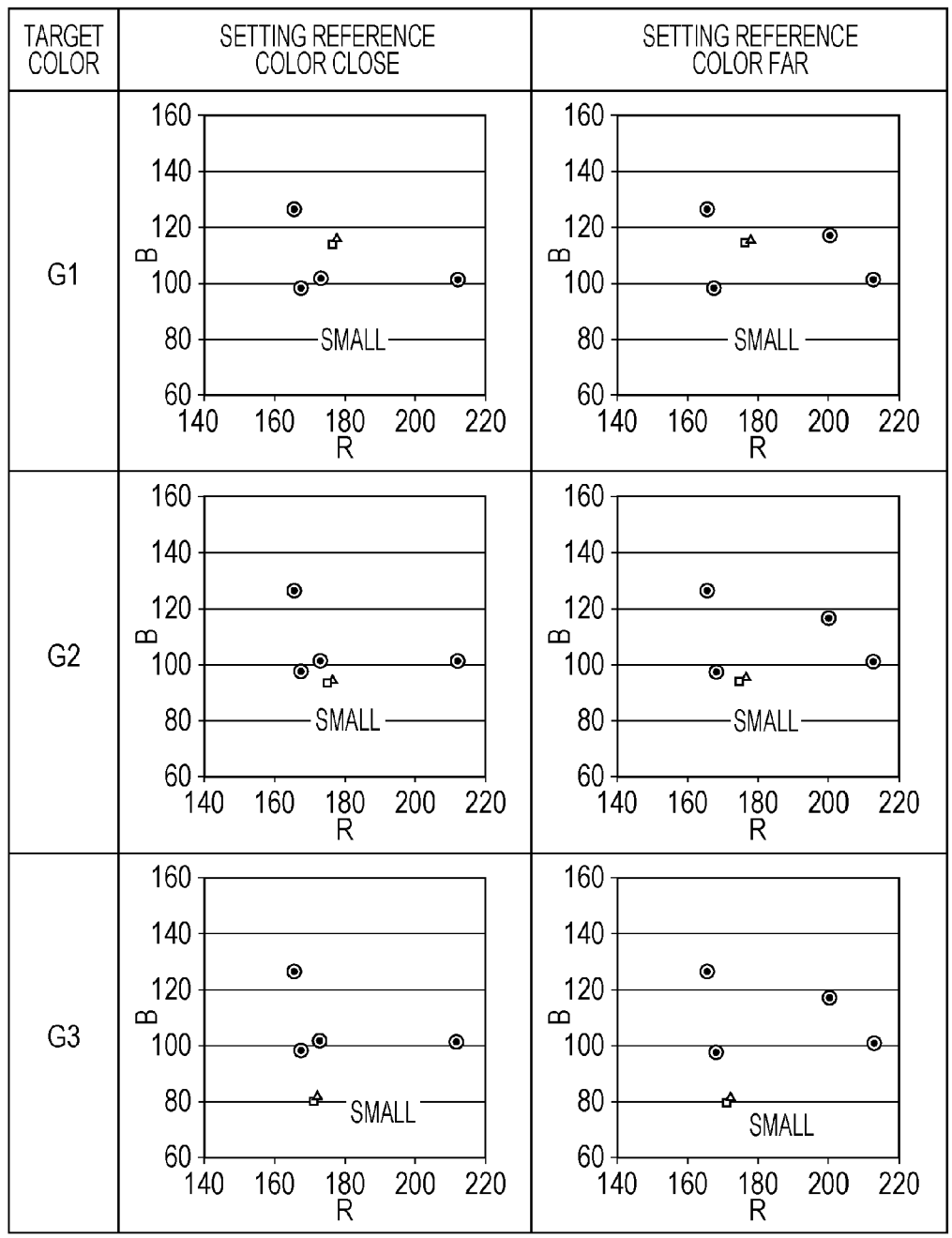
FIG. 9 is graphs that represent examples of interpolation errors in a case where the interpolation process is performed for the target colors and the reference colors when the light source is sunlight.

FIGS. 7 to 9 illustrate the graphs that represent the results. FIG. 7 is the graph in a case where the fluorescent light is employed as the light source. FIG. 8 is the graph in a case where the incandescent light is employed as the light source. FIG. 9 is the graph in a case where sunlight is employed as the light source. For convenience, the three kinds of target colors are denoted as G1 to G3 in FIGS. 7 to 9. In the graphs of FIGS. 7 to 9, the horizontal axis represents the color value of R, and the vertical axis represents the color value of B. Further, in FIGS. 7 to 9, "●" indicates a measurement result of the color value of the reference color by the spectrophotometer, and "○" indicates the color value that is obtained by the color correction to the reference color. In addition, in FIGS. 7 to 9, "□" indicates a measurement result of the color value of the target color by the spectrophotometer, and "Δ" indicates the color value that is obtained by the color correction to the target color.

Figures 10, 11:
FIG. 10 is a chart that summarizes the interpolation errors represented in the graphs of FIGS. 7 to 9.
FIG. 11 is a chart that illustrates conditions of selections of optimal remoteness in accordance with the interpolation errors illustrated in FIG. 10.

In FIGS. 7 to 9, the case where the distance between "□" that indicates the measurement result of the color value of the target color by the spectrophotometer and "Δ" that indicates the color value obtained by the color correction to the target color is shorter represents a smaller error between the target color resulting from the color correction and the original target color. Here, in FIGS. 7 to 9, the relative magnitudes of the errors are indicated by three levels of "large", "medium", and "small" in the graphs. FIG. 10 indicates the magnitudes of the errors as a chart in a list format.

As illustrated in the graphs of FIGS. 7 to 9 and the chart of FIG. 10, as for the target color G2 and the target color G3, selecting the closest reference color to the target color in the RGB color space results in higher accuracy of the color correction to the target color than selecting the farthest reference color, with respect to all the kinds of light sources. However, as for the target color G1, selecting the farthest reference color to the target color in the RGB color space results in higher accuracy of the color correction to the target color than selecting the closest reference color in the cases where the kinds of the light sources are the fluorescent light and the incandescent light. Further, as for the target color G1, selecting the closest reference color results in similar accuracy of the color correction to selecting the farthest reference color in the case where the kind of the light source is sunlight.

Accordingly, as illustrated in FIG. 11, selecting the farthest reference color for the target color G1 and selecting the closest reference colors for the target colors G2 and G3 enable the color correction to the target colors with higher accuracy than selecting the closest reference colors under all conditions. In FIGS. 7 to 9, the positions of "●" that indicates the measurement result of the color value of the reference color by the spectrophotometer correspond with the respective positions of "○" that indicates the color value obtained by the color correction to the reference color. This indicates that the method itself of the color correction is adequate.

As described above, there is a case where the method of selecting the closest reference color to the target color in the color space results in a large error between the target color resulting from the color correction and the original color depending on the combination of the target color and the reference color. A cause of this will be described below.

Figure 12:
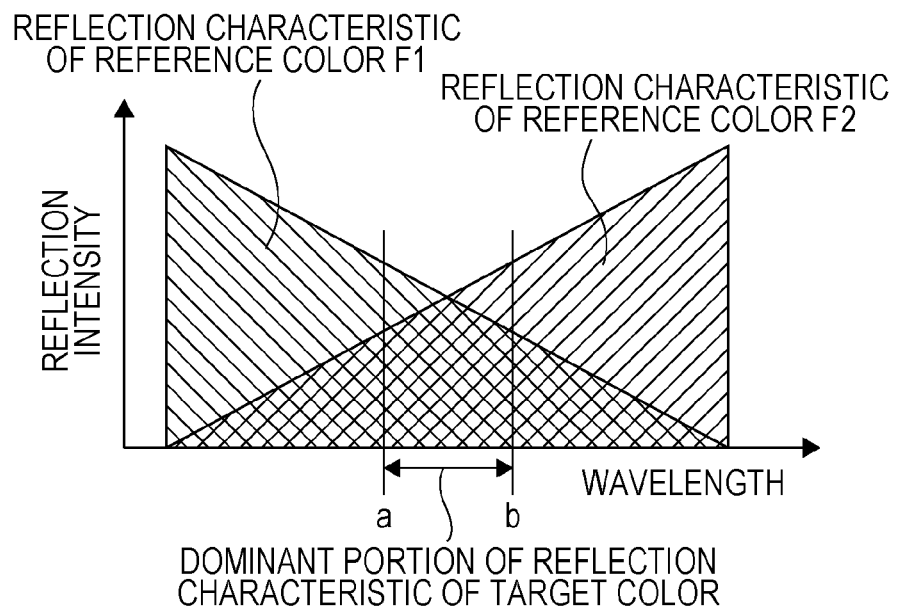
FIG. 12 is a graph that represents examples of spectral reflection characteristics for explaining a reason why accurate color correction is unfeasible.

As illustrated in FIG. 12 as one example, a case will be discussed where the spectral reflection characteristics that represent the relationships between wavelengths and spectral reflection intensities of a reference color F1 and a reference color F2 intersect with each other at intermediate portions thereof. In this case, the difference in the wavelength is slight between point a and point b of the spectral reflection characteristic of an intermediate color of those reference colors. However, the reference color that is largely influenced is different (the reference color F1 at point a and the reference color F2 at point b). In a case where the area around the intersection between the spectral reflection characteristic of the reference color F1 and the spectral reflection characteristic of the reference color F2 is dominant in the spectral reflection characteristic of the target color, the magnitude of the influence largely changes. Thus, it is difficult to establish the linearity in a case where the interpolation process is performed by using those reference colors. Consequently, it is difficult to achieve highly accurate color correction when the color correction to the target color is performed by linear interpolation that includes those reference colors.

Figure 13:
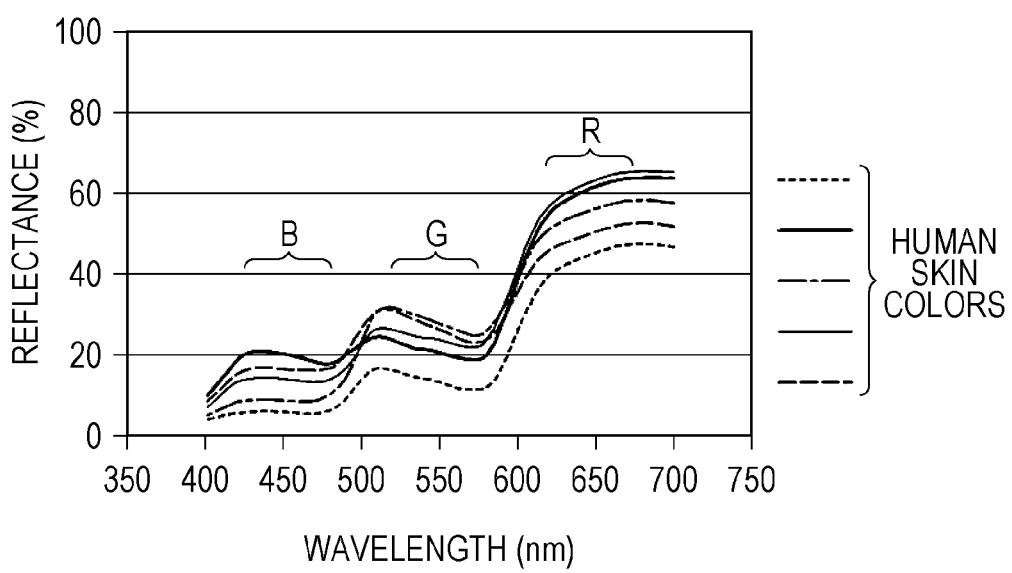
FIG. 13 is a graph that represents examples of spectral reflection characteristics of plural human skin colors for explaining the reason why accurate color correction is unfeasible.

Further, as illustrated in FIG. 13 as one example, in a case where the spectral reflectance of plural target colors (five colors among human skin colors in the example illustrated in FIG. 13) are observed in each of R, G, and B areas that are similar to the characteristics of a color filter in an image-capturing element of the digital camera, the proportional relationships among those five colors are not entirely linear. Accordingly, a color image obtained by photographing by the digital camera is subject to the influence of this non-linearity. As illustrated in FIG. 13, because the non-linearity differs depending on the target color, the appropriateness of the combination of the reference colors differs depending on the target color.

Thus, in order to reject the combinations of the reference colors in which the spectral reflection characteristics intersect with each other in intermediate portions, the color correction device 20 according to this embodiment removes (rejects) the combinations of the reference colors with the wavelength that provides the reverse magnitude relationship about the spectral reflection intensity from the reference colors to be used in the color correction. The phenomenon in which the magnitude relationship about the spectral reflection intensity becomes reverse will hereinafter be referred to as "reverse phenomenon".

Further, the color correction device 20 according to this embodiment identifies the main wavelength from the spectral reflection characteristics of the same type colors as the target color in order to handle the non-linearity of a photographed image due to the above-described characteristics of the image-capturing element of the digital camera. Further, the color correction device 20 according to this embodiment identifies the combination of the reference colors to be rejected from the reference colors to be used in the color correction by using the identified main wavelength as a target.

Figure 14:
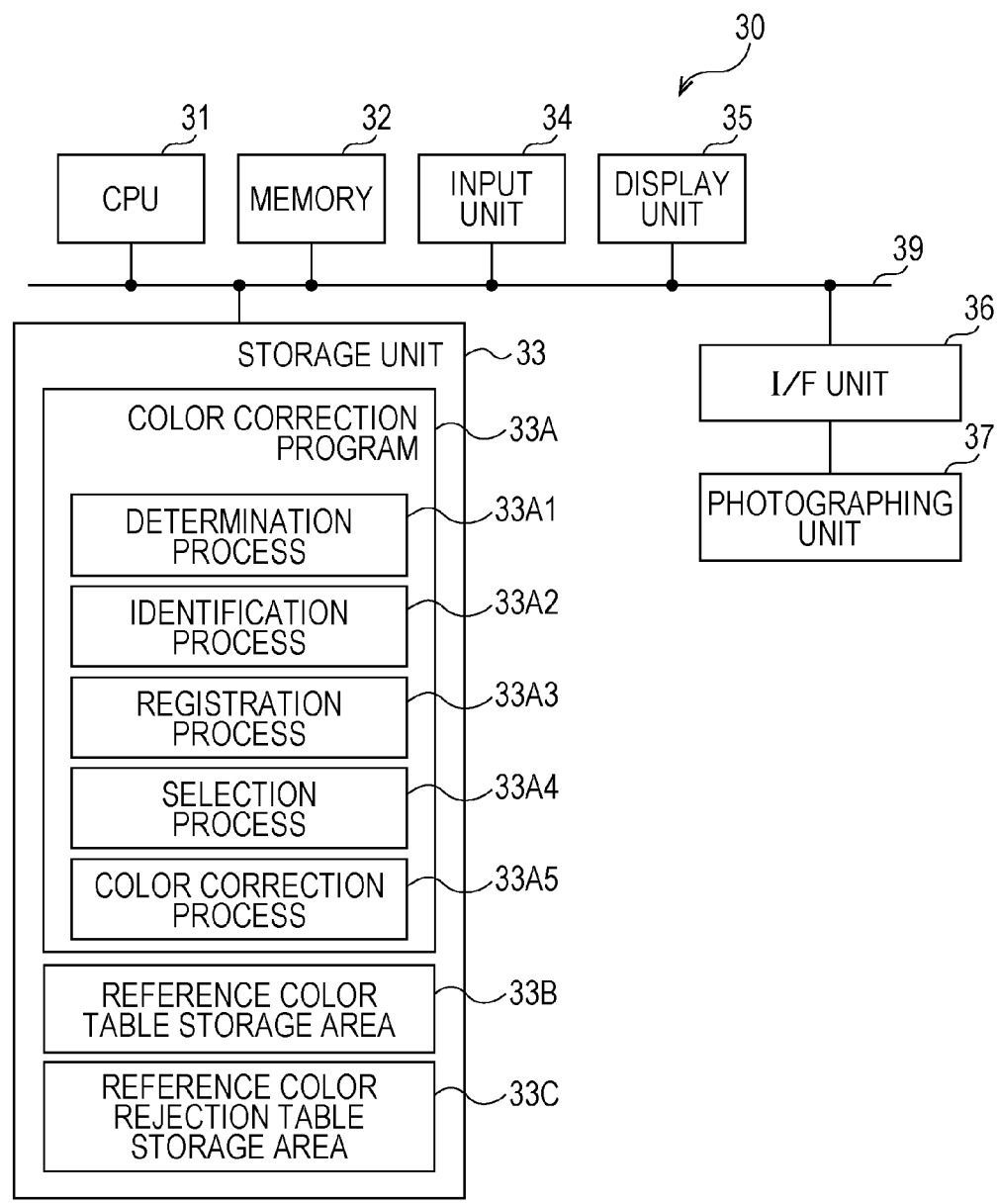
FIG. 14 is a block diagram that illustrates a schematic configuration of a computer according to a first embodiment.

The color correction device 20 may be realized by a computer 30, which is illustrated in FIG. 14, for example. The computer 30 includes a central processing unit (CPU) 31, a memory 32, a storage unit 33, an input unit 34, a display unit 35, and an interface (I/F) unit 36. The CPU 31, the memory 32, the storage unit 33, the input unit 34, the display unit 35, and the I/F unit 36 are connected with each other via a bus 39. A photographing unit 37 is connected to the I/F unit 36.

Further, the storage unit 33 may be realized by a hard disk drive (HDD), a flash memory, or the like. The storage unit 33 as a recording medium stores a color correction program 33A that causes the computer 30 to function as the color correction device 20. The CPU 31 reads out the color correction program 33A from the storage unit 33, expands that in the memory 32, and sequentially executes processes contained in the color correction program 33A.

The color correction program 33A includes a determination process 33A1, an identification process 33A2, a registration process 33A3, a selection process 33A4, and a color correction process 33A5. The CPU 31 executes the determination process 33A1 and thereby operates as the determination unit 11, which is illustrated in FIG. 1. Further, the CPU 31 executes the identification process 33A2 and thereby operates as the identification unit 15, which is illustrated in FIG. 1. Further, the CPU 31 executes the registration process 33A3 and thereby operates as the registration unit 12, which is illustrated in FIG. 1. Further, the CPU 31 executes the selection process 33A4 and thereby operates as the selection unit 13, which is illustrated in FIG. 1. In addition, the CPU 31 executes the color correction process 33A5 and thereby operates as the color correction unit 21, which is illustrated in FIG. 1.

Accordingly, the computer 30 that executes the color correction program 33A functions as the color correction device 20. The color correction program 33A includes a reference color selection program in the disclosed technology.

Meanwhile, the storage unit 33 is provided with a reference color table storage area 33B and a reference color rejection table storage area 33C. The CPU 31 expands data stored in the reference color table storage area 33B in the memory 32 to create a reference color table. Further, the CPU 31 expands data stored in the reference color rejection table storage area 33C in the memory 32 to create a reference color rejection table.

FIG. 15 illustrates one configuration example of the reference color table according to this embodiment. As illustrated in FIG. 15, the reference color table according to this embodiment stores each piece of information of "reference color number" and "reference color".

The "reference color number" is information for individually identifying each of the reference colors provided in the color patch 80, and individual piece of information is allocated to each of the reference colors. Further, the "reference color" is information that indicates the color values of the reference color represented by the associated reference color number. As illustrated in FIG. 15, the reference color table according to this embodiment employs R, G, and B color values themselves as the "reference color".

Meanwhile, FIG. 16 illustrates one configuration example of the reference color rejection table according to this embodiment. As illustrated in FIG. 16, the reference color rejection table according to this embodiment stores each piece of information of "table number", "first reference color number", "second reference color number", and "rejection wavelength".

The "table number" is information for identifying the associated combination of the first reference color number and the second reference color number, and individual piece of information is allocated to each combination. Further, the "first reference color number" and the "second reference color number" are information that indicates the combination of the reference colors to be rejected from targets of reference color selection by the selection unit 13 by the reference color numbers. In addition, the "rejection wavelength" is information that indicates the wavelength that corresponds to an approximate intersection between the spectral reflection characteristics of two reference colors that are represented by the associated first reference color number and second reference color number.

The color correction device 20 may be a smart terminal or the like as a portable color correction device that is equipped with a function of a personal computer (PC) or a personal digital assistant (PDA). Further, the color correction device 20 may be realized by a semiconductor integrated circuit, more particularly, an application specific integrated circuit (ASIC) or the like, for example.

Figure 17:
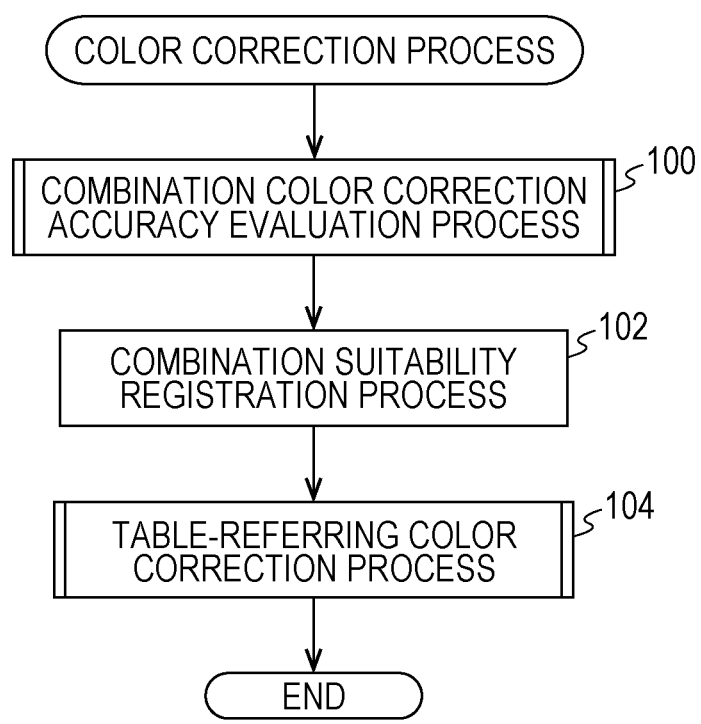
FIG. 17 is a flowchart that illustrates one example of a color correction process according to the first embodiment.

Actions of this embodiment will next be described. In this embodiment, the computer 30 is caused to execute the color correction program 33A, and the color correction process illustrated in FIG. 17 is thereby performed.

A user of the computer 30 according to this embodiment stores a kind number N (eight in this embodiment) of the reference colors provided in the patch portion 82 of the color patch 80 in the storage unit 33 prior to execution of the color correction process. Further, the user measures the same type colors as the target color (human skin colors in this embodiment) by the spectrophotometer and stores information (first characteristic information) that indicates spectral reflection characteristics $R_{obj}(\lambda)$ obtained by the measurement in the storage unit 33. In addition, the user measures the spectral reflection characteristics and the RGB color values of the reference colors provided in the patch portion 82 of the color patch 80 by the spectrophotometer. The user then stores information (second characteristic information) that indicates the spectral reflection characteristics of the measured reference colors (second characteristic information) in the storage unit 33 and stores the color values of the measured reference colors as the reference color table illustrated in FIG. 15 as one example in the reference color table storage area 33B in the storage unit 33.

The color correction process according to this embodiment employs information that indicates the spectral reflection intensities at prescribed intervals (25 nm in this embodiment) from a prescribed lowest wavelength (400 nm in this embodiment) to a prescribed highest wavelength (700 nm in this embodiment) of the same type colors as the first characteristic information. Similarly, the color correction process according to this embodiment employs information that indicates the spectral reflection intensities at the prescribed intervals from the prescribed lowest wavelength to the prescribed highest wavelength of each of the reference colors as the second characteristic information.

After the user stores various kinds of basic information (hereinafter referred to as "prior information") in the storage unit 33, the user photographs the target object with the color patch 80 by the photographing unit 37 of the computer 30, as described above. Accordingly, the color image data obtained by photographing is stored in the storage unit 33.

The computer 30 is caused to execute the color correction program 33A after the above prior preparation by the user, and the color correction process illustrated in FIG. 17 is thereby performed.

Figure 18:
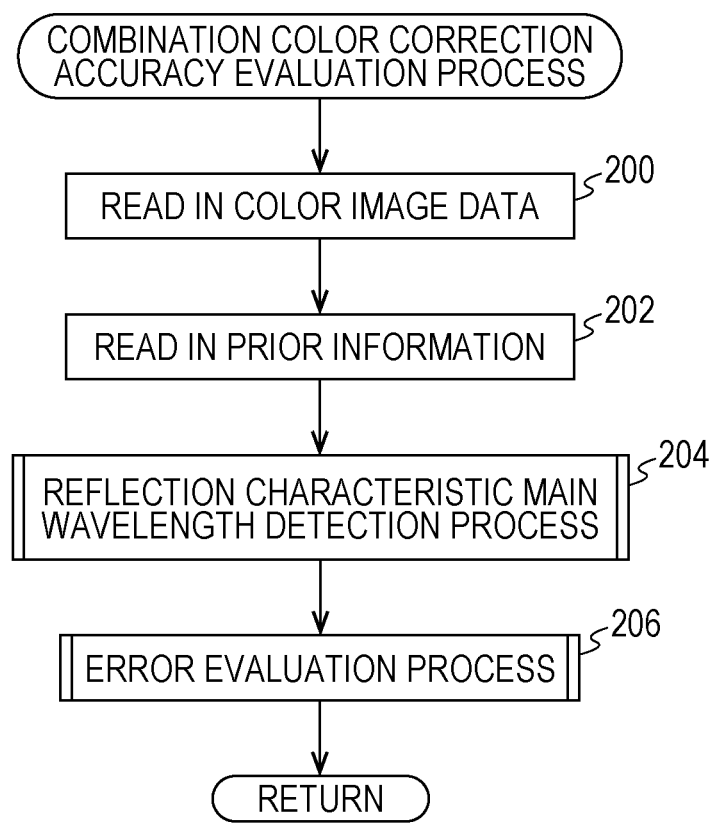
FIG. 18 is a flowchart that illustrates one example of a combination color correction accuracy evaluation process according to the first embodiment.

In step 100 of the color correction process, the color correction unit 21 performs a combination color correction accuracy evaluation process, which is illustrated in FIG. 18.

In step 200 of the combination color correction accuracy evaluation process, the color correction unit 21 reads in the color image data from the storage unit 33. In step 202, the color correction unit 21 reads in the prior information from the storage unit 33.

Figure 19:
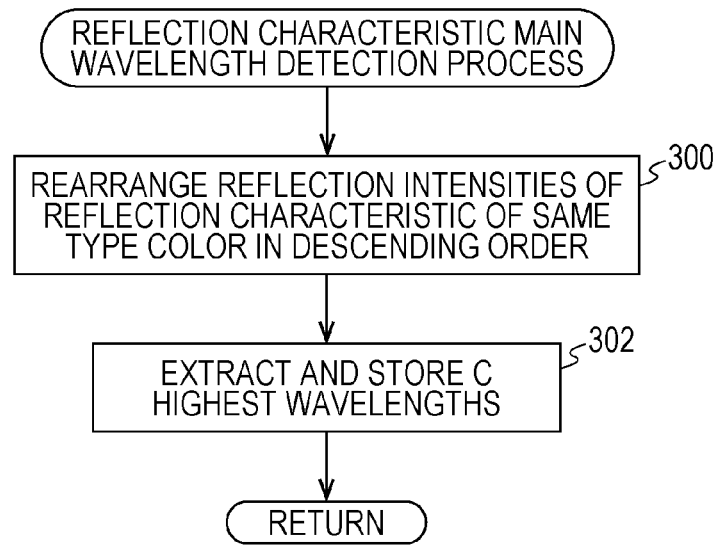
FIG. 19 is a flowchart that illustrates one example of a reflection characteristic main wavelength detection process according to the first embodiment.

In step 204, the identification unit 15 performs a reflection characteristic main wavelength detection process, which is illustrated in FIG. 19.

Figure 20:
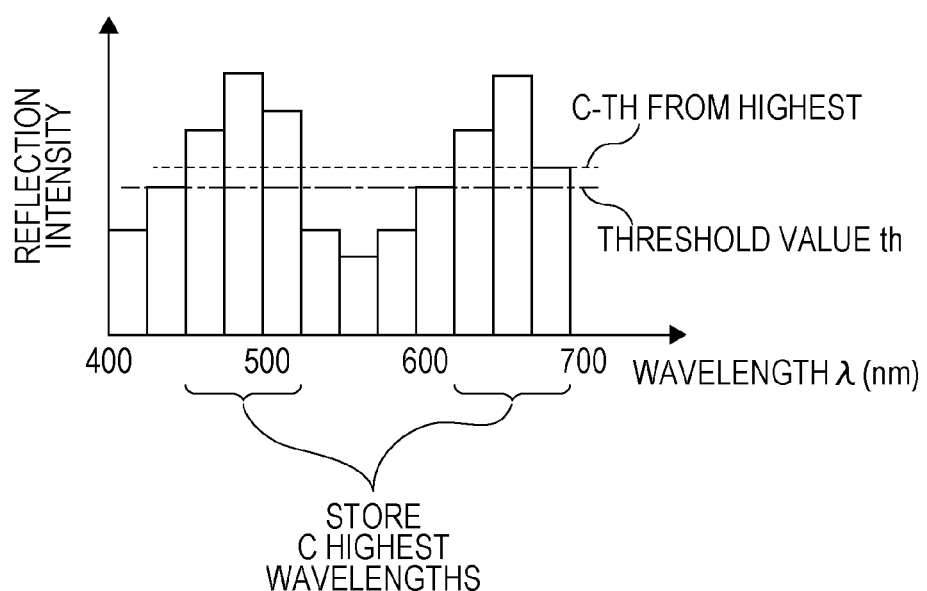
FIG. 20 is a diagram for explaining the reflection characteristic main wavelength detection process and is a graph that represents one example of the spectral reflection characteristic.

In step 300 of the reflection characteristic main wavelength detection process, the identification unit 15 rearranges the spectral reflection intensities of the same type colors as the target color, which are contained in the first characteristic information read in by the process of step 202 of the combination color correction accuracy evaluation process, in the order of height (descending order). In step 302, as illustrated in FIG. 20 as one example, the identification unit 15 extracts the wavelengths that correspond to the highest spectral reflection intensity to the C-th spectral reflection intensity among the spectral reflection intensities rearranged by the process of step 300 as the main wavelengths. In step 302, the identification unit 15 then stores the extracted main wavelengths in the storage unit 33 and thereafter finishes the reflection characteristic main wavelength detection process. For example, in a case where the spectral reflection characteristic indicated by the first characteristic information is as illustrated in FIG. 20 and the value of C is 6, the main wavelengths extracted by the reflection characteristic main wavelength detection process are 6 kinds of 450 nm, 475 nm, 500 nm, 625 nm, 650 nm, and 675 nm.

In the color correction process according to this embodiment, a prescribed ratio (50% in this embodiment) of the number of wavelengths included in the spectral reflection characteristic that is indicated by the first characteristic information is employed as the value of C, but the value of C is not limited to this. For example, a preset fixed value may be used as the value of C. A mode may be used in which the value of C set by the user via the input unit 34 or the like is used. Further, the mode is not limited to a mode in which the main wavelengths are identified with the highest spectral reflection intensity being the reference. As illustrated in FIG. 20, a mode may be used in which the wavelengths whose spectral reflection intensities are a predetermined threshold value th or higher are identified as the main wavelengths. In this mode, because the spectral reflection intensities do not have to be rearranged in descending order, the main wavelength may more easily be identified.

Figure 21:
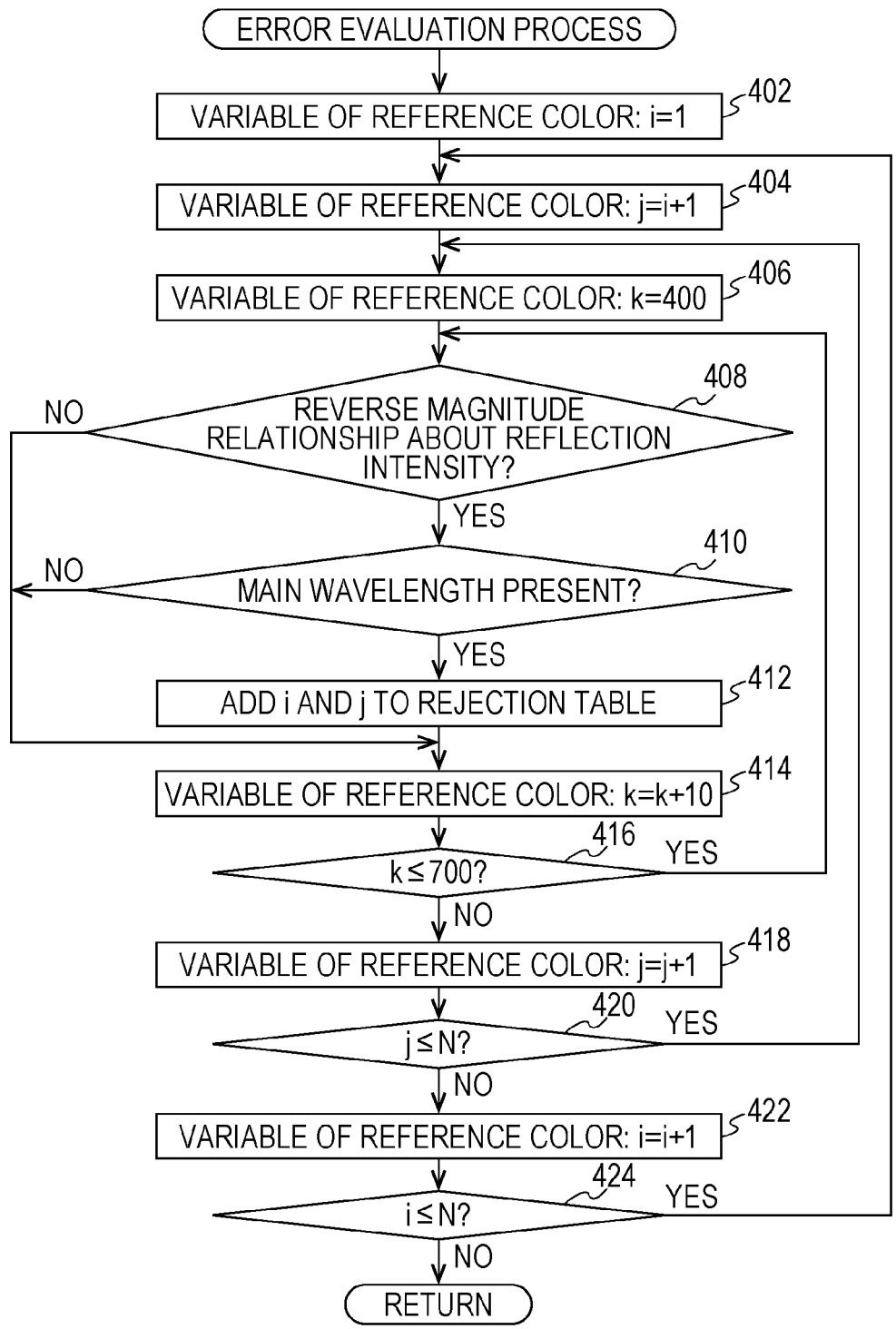
FIG. 21 is a flowchart that illustrates one example of an error evaluation process according to the first embodiment.

When the reflection characteristic main wavelength detection process is finished, the process moves to step 206 of the combination color correction accuracy evaluation process (see FIG. 18). In step 206, the determination unit 11 performs an error evaluation process, which is illustrated in FIG. 21.

In step 402 of the error evaluation process, the determination unit 11 substitutes 1 for variable i. In step 404, the determination unit 11 substitutes the value obtained by adding 1 to the value of variable i for variable j. Further, in step 406, the determination unit 11 substitutes the value of the lowest wavelength (400 nm in this embodiment) for variable k.

Figure 22:
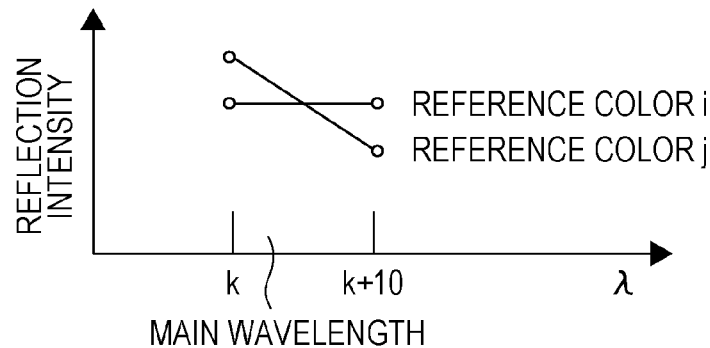
FIG. 22 is a graph that represents an example of the spectral reflection characteristic in a case where there is a wavelength that provides a reverse magnitude relationship about the reflection intensity.

In step 408, as illustrated in FIG. 22 as one example, the determination unit 11 determines whether or not the magnitude relationship between the spectral reflection intensity of the i-th reference color (the reference color whose reference color number is i) at wavelength k and the spectral reflection intensity of the j-th reference color is reverse to the similar magnitude relationship at wavelength k+10 nm. Here, when the determination is negative, the process moves to step 414, which will be described below. On the other hand, when the determination is affirmative, the process moves to step 410. The increment value "+10 nm" in "wavelength k+10 nm" that is employed in step 408 is merely one example. Another value such as "+5 nm" or "+20 nm" may be employed in accordance with the resolution for the wavelengths of the spectral reflection characteristic, the distance between two target reference colors in the color space, or the like.

In step 410, the determination unit 11 determines whether or not the main wavelengths obtained by the reflection characteristic main wavelength detection process include wavelength k or wavelength k+10 nm. When the determination is negative, the process moves to step 414. On the other hand, when the determination is affirmative, the process moves to step 412.

In step 412, the determination unit 11 stores the values of variable i and variable j as the first reference color number and the second reference color number in the reference color rejection table (see FIG. 16 also) in the memory 32. Here, the determination unit 11 stores the central wavelength between wavelength k and wavelength k+10 nm with a new table number as the rejection wavelength in the reference color rejection table in the memory 32, and the process thereafter moves to step 414.

In step 414, the determination unit 11 increases the value of variable k only by the increment value (+10 nm in this embodiment). In next step 416, the determination unit 11 determines whether or not the value of variable k is the value of the highest wavelength (700 nm in this embodiment) or lower. Here, when the determination is affirmative, the process returns to step 408. When the determination is negative, the process moves to step 418.

In step 418, the determination unit 11 increases the value of variable j only by 1. In next step 420, the determination unit 11 determines whether or not the value of variable j is the kind number N of the reference colors or less. Here, when the determination is affirmative, the process returns to step 406. When the determination is negative, the process moves to step 422.

In step 422, the determination unit 11 increases the value of variable i only by 1. In next step 424, the determination unit 11 determines whether or not the value of variable i is the kind number N of the reference colors or less. Here, when the determination is affirmative, the process returns to step 404. On the other hand, when the determination is negative, the error evaluation process is finished. When the error evaluation process is finished, the combination color correction accuracy evaluation process, which is illustrated in FIG. 18, is finished.

The reference color rejection table, which is illustrated in FIG. 16 as one example, is created in the memory 32 by the combination color correction accuracy evaluation process according to this embodiment.

When the combination color correction accuracy evaluation process is finished, the registration unit 12 performs a combination suitability registration process in step 102 of the color correction process, which is illustrated in FIG. 17. The registration unit 12 according to this embodiment performs a process of storing the reference color rejection table stored in the memory 32 by the combination color correction accuracy evaluation process in the reference color rejection table storage area 33C of the storage unit 33 without any change, as the combination suitability registration process.

Figure 23:
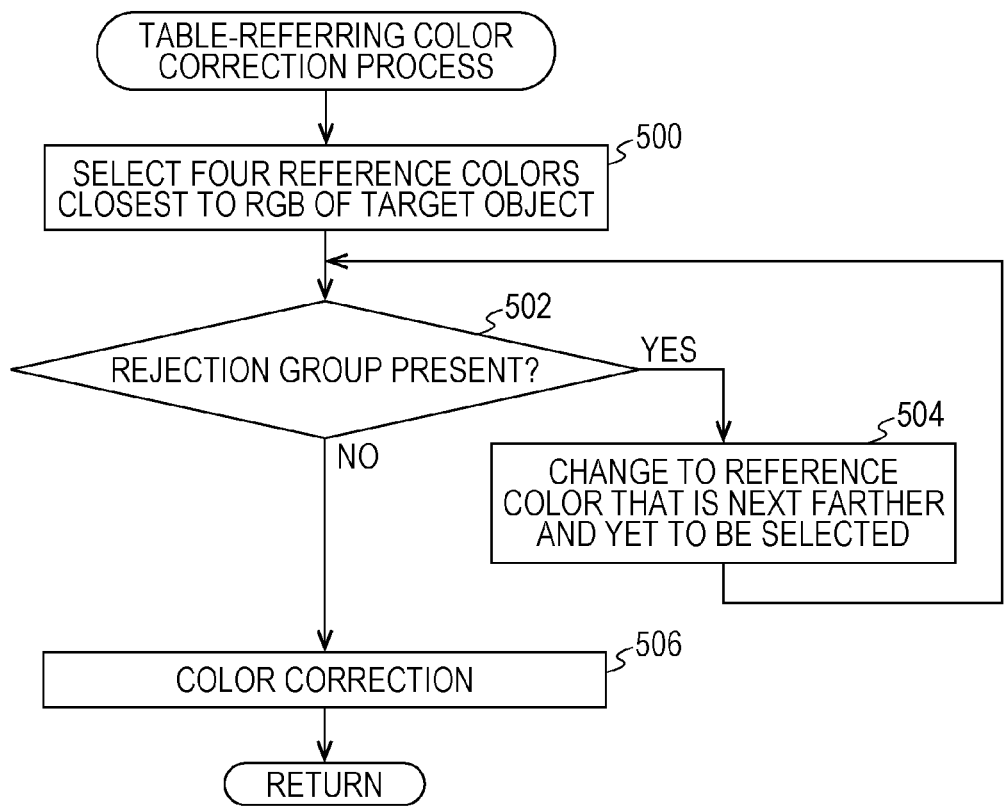
FIG. 23 is a flowchart that illustrates one example of a table-referring color correction process according to the first embodiment.

In step 104, the color correction unit 21 performs a table-referring color correction process, which is illustrated in FIG. 23.

In step 500 of the table-referring color correction process, the selection unit 13 extracts the color values of R, G, and B in the target area positioned in the opening 84 of the color patch 80 from the color image data that are read in by the process of step 200 of the combination color correction accuracy evaluation process. Further, the selection unit 13 calculates the average value of the extracted color values of each of R, G, and B. The average values of R, G, and B calculated here will be expressed as (r', g', b') below. Identification of the target area in this process may be performed by an image recognition technology in related art.

The selection unit 13 selects four reference colors in the order of closeness to the calculated (r', g', b') in the RGB color space by using the reference color table read in by the process of step 202 of the combination color correction accuracy evaluation process.

In step 502, the selection unit 13 determines whether or not the selected four reference colors (hereinafter referred to as "selection candidate reference color") include reference color combinations associated with the table numbers in the reference color rejection table (hereinafter referred to as "rejection group"). Here, when the determination is affirmative, the process moves to step 504.

The process thereafter returns to step 502. Further, when the determination is negative in step 502, the process moves to step 506.

In step 506, the color correction unit 21 performs the color correction to the target object in the following procedures.

First, the color correction unit 21 sets the color values of R, G, and B of four selection candidate reference colors (hereinafter referred to as "selection reference color") obtained by the above process as $(r_i', g_i', b_i')$ (here, i =0, 1, 2, 3) and calculates weighting coefficient $w_i$ to be the condition indicated in equation (3) by equation (4).

$$\begin{bmatrix} r' \\ g' \\ b' \end{bmatrix} = \sum_{i=1}^{3} w_i \begin{bmatrix} r'_i - r'_0 \\ g'_i - g'_0 \\ b'_i - b'_0 \end{bmatrix} \quad (3)$$

$$\begin{bmatrix} w_1 \\ w_2 \\ w_3 \end{bmatrix} = \begin{bmatrix} r'_1 - r'_0 & r'_2 - r'_0 & r'_3 - r'_0 \\ g'_1 - g'_0 & g'_2 - g'_0 & g'_3 - g'_0 \\ b'_1 - b'_0 & b'_2 - b'_0 & b'_3 - b'_0 \end{bmatrix}^{-1} \begin{bmatrix} r' \\ g' \\ b' \end{bmatrix} \quad (4)$$

Next, the color correction unit 21 sets the color values of R, G, and B of the selection reference colors indicated by the reference color table as $(r_i, g_i, b_i)$ (here, i=0, 1, 2, 3), substitutes the color values and weighting coefficient $w_i$ into equation (5), and thereby calculates the color values (r, g, b) resulting from the color correction to the target color.

$$\begin{bmatrix} r \\ g \\ b \end{bmatrix} = \sum_{i=1}^{3} w_i \begin{bmatrix} r_i - r_0 \\ g_i - g_0 \\ b_i - b_0 \end{bmatrix} \quad (5)$$

Then, the color correction unit 21 converts all pixel data that correspond to the target area of the target object in the color image data into derived color values (r, g, b) and finishes the color correction.

When the color correction in step 506 is finished, the table-referring color correction process is finished, and the color correction process illustrated in FIG. 17 is finished.

As described above in detail, in this embodiment, the following process is performed for a color group to be the candidates of plural reference colors that are used in a case where the color correction to the target color is performed by the interpolation process by using the plural reference colors (four reference colors in this embodiment). First, the magnitude relationships between the color intensities (the spectral reflection intensities in this embodiment) of the first candidate color and the color intensities of the second candidate color are compared with respect to plural wavelengths, and a determination is made whether or not there is any wavelength that provides the reverse magnitude relationship to the magnitude relationship between the other wavelengths. Then, in a case where there is not the combination of the first candidate color and the second candidate color in which there is the wavelength that provides the reverse magnitude relationship in the color group to be the candidates of the reference colors, the color group is selected as the reference colors. Thus, in this embodiment, preferable reference colors may be selected. As a result, the color correction is performed by using the reference colors, and the colors of a color image obtained by photographing may thereby be approximated to the original colors while the influence of light in the photographing is reduced.

Particularly, in this embodiment, the combinations of colors that are not suitable for the reference colors to be used in the color correction are obtained by checking whether or not there is the reverse phenomenon. This allows the computation amount to be reduced compared to the computation amount in a case where whether or not the error from the original color in the case of color correction by selecting the reference color close to the target color in the color space becomes larger than the case of selecting another reference color is continuously checked for all reference colors of the color patch.

Further, in this embodiment, the first characteristic information that indicates the spectral reflection characteristics of the same type colors as the target color and the second characteristic information that indicates the spectral reflection characteristics of the color group to be the candidates of the reference colors are in advance stored. The wavelengths that are mainly featured (main wavelengths) are identified from the spectral reflection characteristics of the same type colors that are indicated by the first characteristic information. In addition, in this embodiment, a determination is made whether or not there is the wavelength that provides the reverse magnitude relationship about the spectral reflection characteristics indicated by the second characteristic information with respect to the wavelength identified as the target. Thus, in this embodiment, the preferable reference colors may be selected with high accuracy compared to a case where a determination is made whether or not there is the wavelength that provides the reverse magnitude relationship among the wavelengths including unused wavelengths.

Particularly, in this embodiment, the predetermined number of wavelengths from the wavelength with the highest spectral reflection intensity in descending order are identified as the main wavelengths based on the spectral reflection characteristics of the same type colors. The main wavelengths may easily be identified.

Further, in this embodiment, in a case where a determination is made that there is the wavelength that provides the reverse magnitude relationship, the information that indicates the combination of the first candidate color and the second candidate color as the targets of the determination is registered as the rejection information that rejects the combination from the reference colors to be used in color correction (the reference color rejection table in this embodiment). In addition, in this embodiment, the registered rejection information is referred to, and the color group to be the candidates of the reference colors, in which there is not the combination of the first candidate color and the second candidate color that are indicated by the rejection information, is thereby selected as the reference colors. Thus, in this embodiment, the preferable reference colors may easily be selected by using the rejection information.

Further, in this embodiment, the color correction to the target color is performed by the interpolation process based on the color information of the colors of the color group and the target color that is obtained by photographing the color patch and the target object and the color information that indicates the original colors of the colors of the color group. Particularly, in this embodiment, the color information resulting from the color correction to the target color is derived by equations (3) to (5). Thus, the color correction may be performed by using the reference colors that are preferably selected as described above. As a result, the color correction may be performed with higher accuracy.

In the above embodiment, a description is made about a case where the reference colors to be rejected are determined with respect to the main wavelengths as the targets. However, the determination of the reference colors is not limited to this. For example, a mode may be used in which the reference colors to be rejected are determined with respect to wavelengths within the range that is predetermined as the range where the reverse phenomenon possibly occurs, without setting the main wavelength, as the target. In this case, the reflection characteristic main wavelength detection process does not have to be executed. Thus, the color correction process may be simplified.

Further, the configuration of the reference color rejection table is not limited to the one illustrated in FIG. 16. For example, in the above embodiment, the table information and the information of the rejection wavelengths are not both used. Thus, at least one of those pieces of information may not be included. The rejection wavelength is information that indicates the wavelength that corresponds to an approximate intersection between the spectral reflection characteristics of two reference colors that are represented by the associated first reference color number and second reference color number. Approximate color tones of the associated reference colors may be understood by referring to the rejection wavelength.

[Second Embodiment]

A second embodiment of the disclosed technology will next be described. The same portions as the first embodiment are provided with the same reference characters, and descriptions thereof will be omitted as much as possible.

Figure 24:
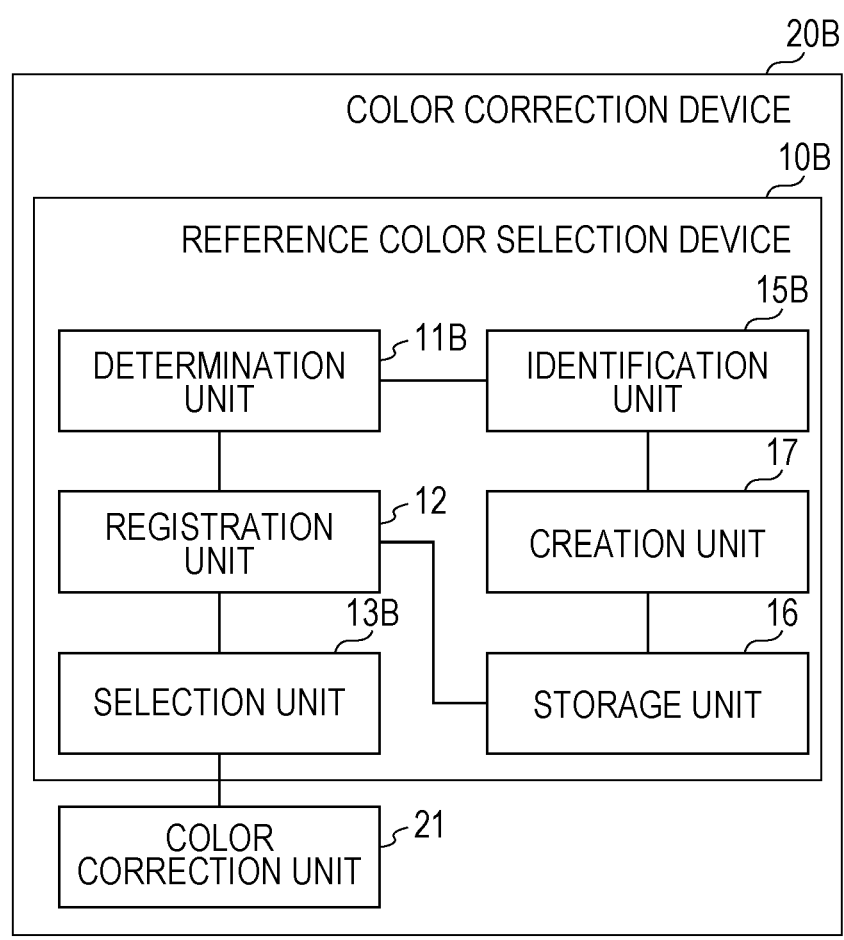
FIG. 24 is a function block diagram of a color correction device according to a second embodiment.

FIG. 24 illustrates a reference color selection device 10B and a color correction device 20B according to a second embodiment. As illustrated in FIG. 24, the color correction device 20B according to the second embodiment is different from the color correction device 20 according to the first embodiment in the point that the determination unit 11 is substituted by a determination unit 11B that performs different processes from the determination unit 11. Further, the color correction device 20B according to the second embodiment is different from the color correction device 20 according to the first embodiment in the point that the identification unit 15 is substituted by an identification unit 15B that performs different processes from the identification unit 15. Further, the color correction device 20B according to the second embodiment is different from the color correction device 20 according to the first embodiment in the point that the selection unit 13 is substituted by a selection unit 13B that performs different processes from the selection unit 13. In addition, the color correction device 20B according to the second embodiment is different from the color correction device 20 according to the first embodiment in the point that a creation unit 17 is newly added between the identification unit 15B and the storage unit 16.

That is, the identification unit 15 of the color correction device 20 according to the first embodiment identifies the main wavelengths from a single spectral reflection characteristic that is indicated by the first characteristic information (the information that indicates the spectral reflection characteristics of the same type colors of the target color). On the other hand, the creation unit 17 of the color correction device 20B according to the second embodiment creates new spectral reflection characteristics based on more actual conditions by using third characteristic information, which indicates plural spectral reflection characteristics (three in this embodiment) that indicate principal components of the spectral reflection characteristics of the plural and mutually different same type colors of a sample color with respect to each of plural sample colors that possibly serve as the target color. Specifically, the creation unit 17 creates plural spectral reflection characteristics that reflect spectral sensitivity characteristics of an image-capturing unit that captures an image of the target color (the photographing unit 37 in this embodiment) and a spectral characteristic of a standard light source with respect to each of the plural spectral reflection characteristics of each of the sample colors, which is indicated by the third characteristic information. Further, the identification unit 15B identifies the main wavelengths with respect to each of the sample colors from the plural spectral reflection characteristics created by the creation unit 17. Examples of the plural spectral reflection characteristics indicated by the third characteristic information may include the spectral reflection characteristics that are obtained by extracting plural waveforms with characteristic shapes from the spectral reflection characteristics of the five colors among human skin colors illustrated in FIG. 13 as one example by a principal component analysis or the like.

Meanwhile, the determination unit 11B according to the second embodiment determines whether or not there is the wavelength that provides the reverse magnitude relationship about the spectral reflection characteristics indicated by the second characteristic information with respect to the main wavelength identified by the identification unit 15B as the target, for each of the sample colors. Then, the determination unit 11B creates a similar reference color rejection table to the first embodiment for each of the plural sample colors. Further, the selection unit 13B according to the second embodiment selects the reference colors to be used in the color correction by using the reference color rejection table that corresponds to the closest sample color to the target color in the color space.

Figure 25:
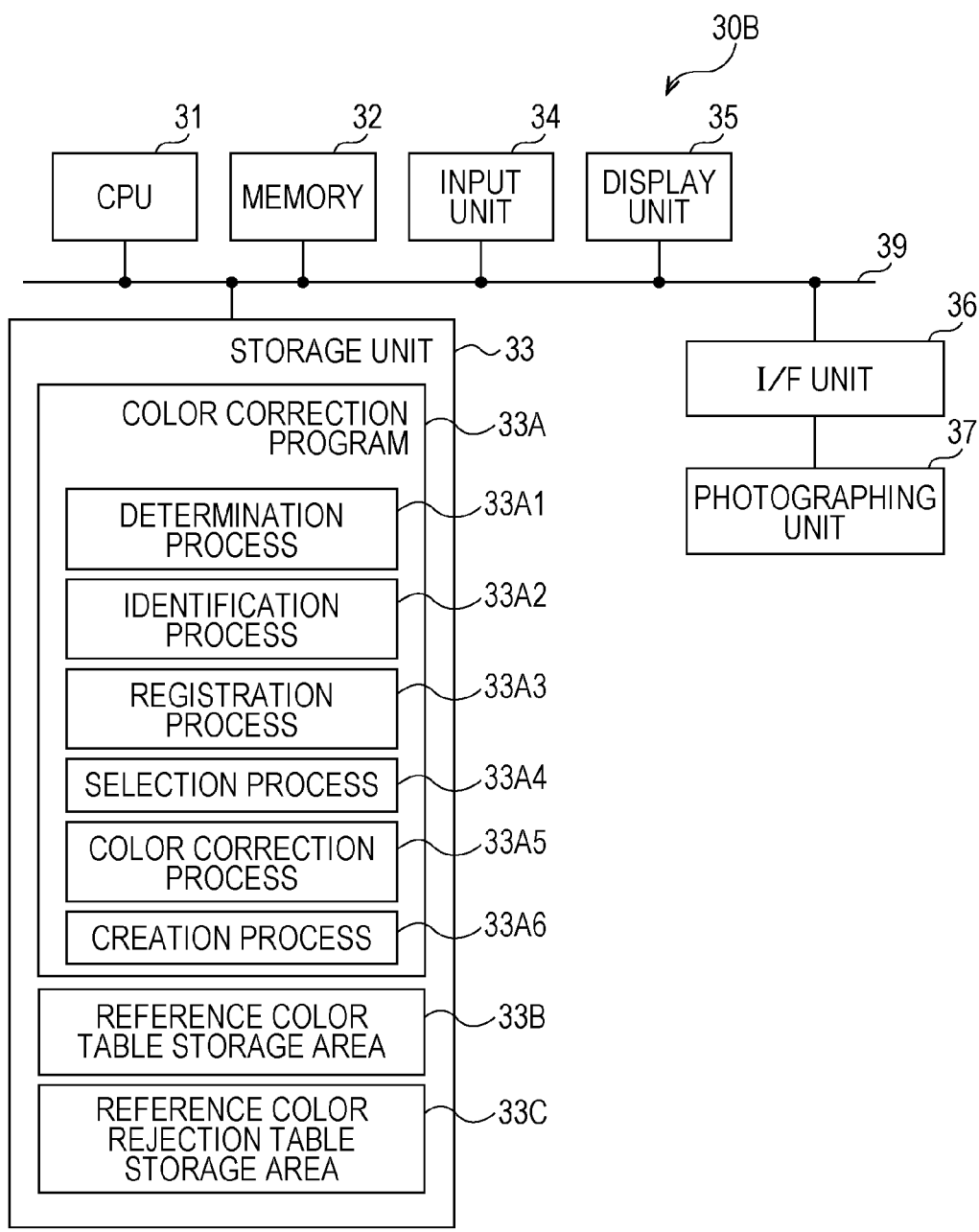
FIG. 25 is a block diagram that illustrates a schematic configuration of a computer according to the second embodiment.

The color correction device 20B according to the second embodiment may be realized by a computer 30B, which is illustrated in FIG. 25, for example. As illustrated in FIG. 25, the computer 30B according to the second embodiment is different from the computer 30 according to the first embodiment in the point that a creation process 33A6 is newly added to the color correction program 33A. The CPU 31 executes the creation process 33A6 and thereby operates as the creation unit 17, which is illustrated in FIG. 24.

Accordingly, the computer 30B that executes the color correction program 33A functions as the color correction device 20B.

The computer 30B may also be a smart terminal as the portable color correction device that is equipped with the function of the PC or the PDA. Further, the computer 30B may also be realized by a semiconductor integrated circuit, more particularly, an ASIC or the like, for example.

Figure 26:
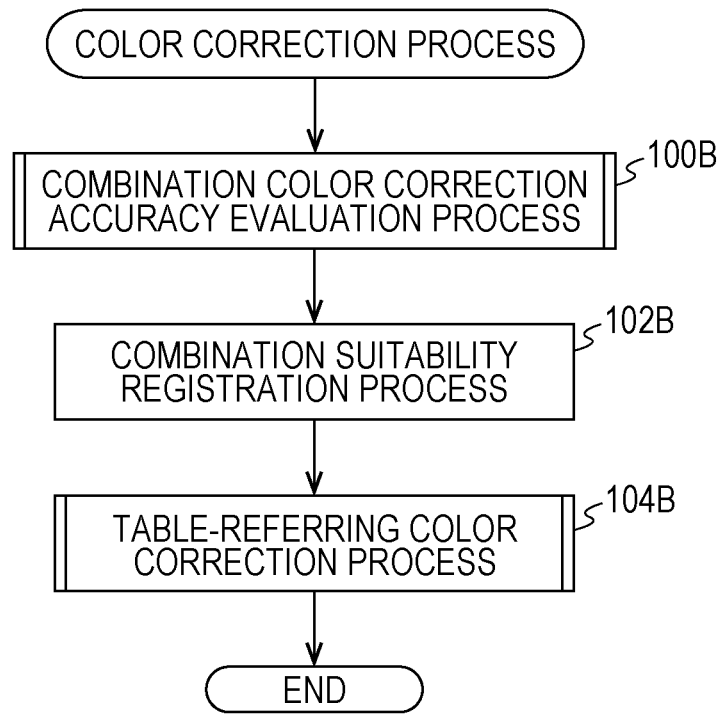
FIG. 26 is a flowchart that illustrates one example of a color correction process according to the second embodiment.

Actions of the second embodiment will next be described. In the second embodiment also, the computer 30B is caused to execute the color correction program 33A illustrated in FIG. 25, and the color correction process illustrated in FIG. 26 is thereby performed.

Similarly to the first embodiment, a user of the computer 30B according to the second embodiment stores, in the storage unit 33, the reference color table, the kind number N of the reference colors, and the second characteristic information as the prior information prior to execution of the color correction process.

Further, the user stores, in the storage unit 33, information that indicates plural (three in this embodiment) spectral reflection characteristics $\phi_{obj}^{(1)}(\lambda)$, $\phi_{obj}^{(2)}(\lambda)$, and $\phi_{obj}^{(3)}(\lambda)$, which indicate the principal components of the spectral reflection characteristics of the plural and mutually different same type colors of the sample color, for each of the sample colors as the prior information.

Further, the user stores, in the storage unit 33, photographing unit information that indicates spectral sensitivity characteristics $r(\lambda)$, $g(\lambda)$, and $b(\lambda)$ of the photographing unit 37 and light source information that indicates a spectral characteristic $s(\lambda)$ of the standard light source (a D65 light source in this embodiment) as the prior information. In addition, the user stores, in the storage unit 33, information that indicates the color values of R, G, and B of the sample colors (hereinafter referred to as "sample information") and the number S of the sample colors as the prior information.

After the user stores the above prior information in the storage unit 33, similarly to the first embodiment, the user photographs the target object with the color patch 80 by the photographing unit 37 of the computer 30B. Accordingly, the color image data obtained by photographing is stored in the storage unit 33.

The computer 30B is caused to execute the color correction program 33A after the above prior preparation by the user, and the color correction process illustrated in FIG. 26 is thereby performed.

Figure 27:
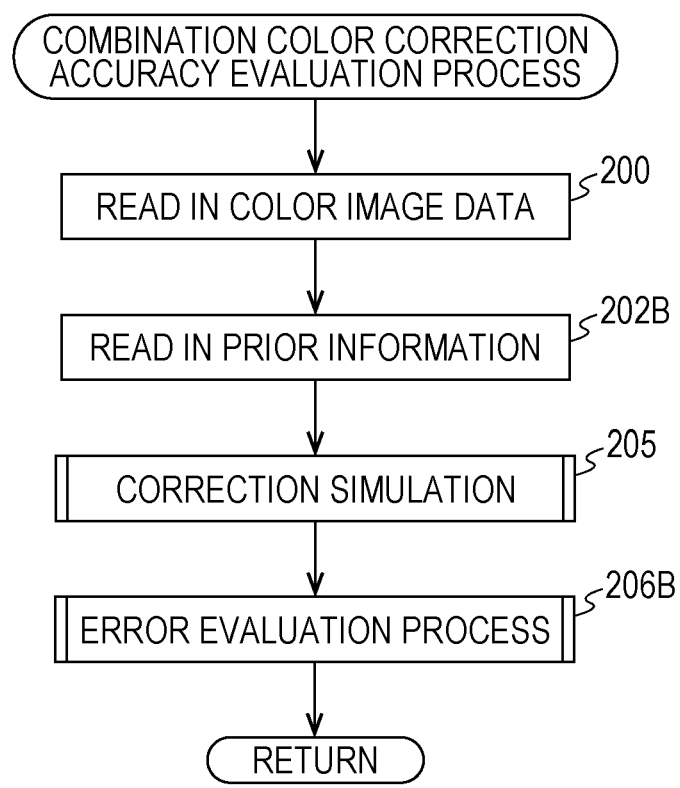
FIG. 27 is a flowchart that illustrates one example of a combination color correction accuracy evaluation process according to the second embodiment.

In step 100B of the color correction process, the color correction unit 21 performs a combination color correction accuracy evaluation process, which is illustrated in FIG. 27.

In step 200 of the combination color correction accuracy evaluation process, the color correction unit 21 reads in the color image data from the storage unit 33. In step 202B, the color correction unit 21 reads in the prior information from the storage unit 33.

Figure 28:
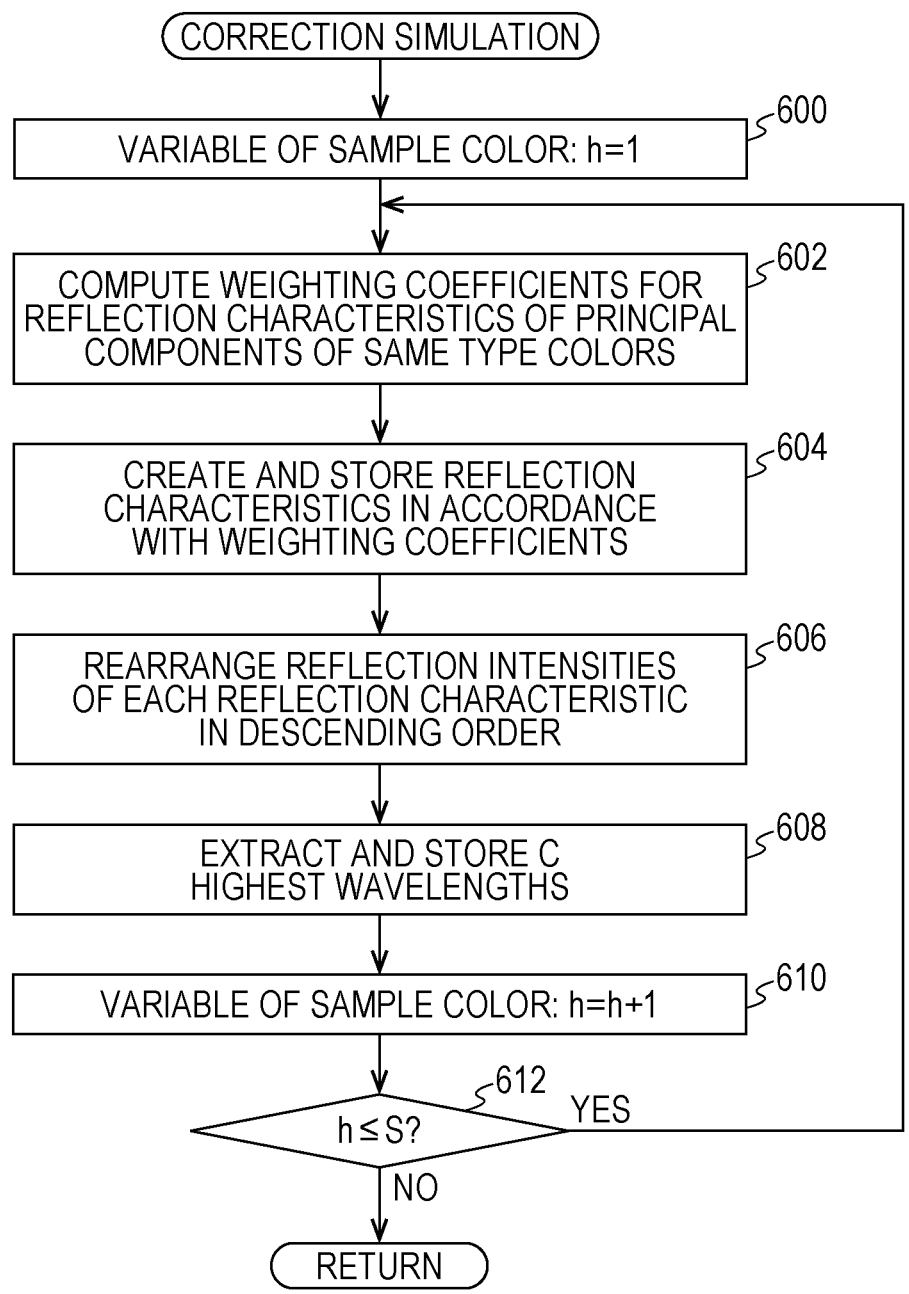
FIG. 28 is a flowchart that illustrates one example of a correction simulation according to the second embodiment.

In step 205, the creation unit 17 performs a correction simulation, which is illustrated in FIG. 28.

In step 600 of the correction simulation, the creation unit 17 substitutes 1 for variable h. In step 602, the creation unit 17 calculates weighting coefficients $w_i$ (here, i=1, 2, 3) for the plural (three in this embodiment) spectral reflection characteristics that correspond to any one of the sample colors (hereinafter referred to as "process target sample color") and that are indicated by the third characteristic information.

That is, the color values (r, g, b) of the target color that are indicated by the color image data obtained by photographing are determined by the spectral characteristic of the light source used in photographing, the spectral reflection characteristic of the color, and the spectral sensitivity characteristics of the digital camera used for photographing (the photographing unit 37 in this embodiment). Thus, the following equation (6) holds true.

$$\begin{bmatrix} r \\ g \\ b \end{bmatrix} = \begin{bmatrix} r(\lambda) \\ g(\lambda) \\ b(\lambda) \end{bmatrix}^T s(\lambda)[\phi_{obj}^{(1)}(\lambda), \phi_{obj}^{(2)}(\lambda), \phi_{obj}^{(3)}(\lambda)] \begin{bmatrix} w_1 \\ w_2 \\ w_3 \end{bmatrix} \quad (6)$$

Accordingly, weighting coefficients $w_1$ to $w_3$ may be calculated by the following equation (7). However, the term $s(\lambda)$ in equations (6) and (7) is a matrix in which the spectral characteristic of the light source is arranged in the diagonal elements.

$$\begin{bmatrix} w_1 \\ w_2 \\ w_3 \end{bmatrix} = \left( \begin{bmatrix} r(\lambda) \\ g(\lambda) \\ b(\lambda) \end{bmatrix}^T s(\lambda)[\phi_{obj}^{(1)}(\lambda), \phi_{obj}^{(2)}(\lambda), \phi_{obj}^{(3)}(\lambda)] \right)^{-1} \begin{bmatrix} r \\ g \\ b \end{bmatrix} \quad (7)$$

In step 604, the creation unit 17 multiplies weighting coefficients $w_1$ to $w_3$ by the corresponding spectral reflection characteristics $\phi_{obj}^{(1)}(\lambda)$, $\phi_{obj}^{(2)}(\lambda)$, and $\phi_{obj}^{(3)}(\lambda)$ in the following equations (8) to (10), thereby creates the spectral reflection characteristics that correspond to those characteristics, and stores the spectral reflection characteristics in the storage unit 33.

$$w_1 \times \phi_{obj}^{(1)}(\lambda) \quad (8)$$

$$w_2 \times \phi_{obj}^{(2)}(\lambda) \quad (9)$$

$$w_3 \times \phi_{obj}^{(3)}(\lambda) \quad (10)$$

In step 606, the identification unit 15B rearranges the spectral reflection intensities of the plural spectral reflection characteristics of the process target sample color, which are obtained by the above process, in the order of height (descending order) with respect to each of the spectral reflection characteristics. In step 608, similarly to step 302 of the reflection characteristic main wavelength detection process according to the first embodiment, the identification unit 15B extracts the wavelengths that correspond to the highest spectral reflection intensity to the C-th spectral reflection intensity among the spectral reflection intensities that are rearranged with respect to each of the spectral reflection characteristics by the process of step 606 as the main wavelengths. In step 608, the identification unit 15B then associates the extracted main wavelengths with information for identifying the process target sample color and stores those in the storage unit 33.

In step 610, the creation unit 17 increases the value of variable h only by 1. In next step 612, the creation unit 17 determines whether or not the value of variable h is the number S of the sample colors or less. Here, when the determination is affirmative, the process returns to above step 602. On the other hand, when the determination is negative, the correction simulation is finished.

When the processes of above steps 602 to 612 are repeatedly executed, the creation unit 17 employs the sample colors that are previously not set as the process targets as the process target sample colors.

Figure 29:
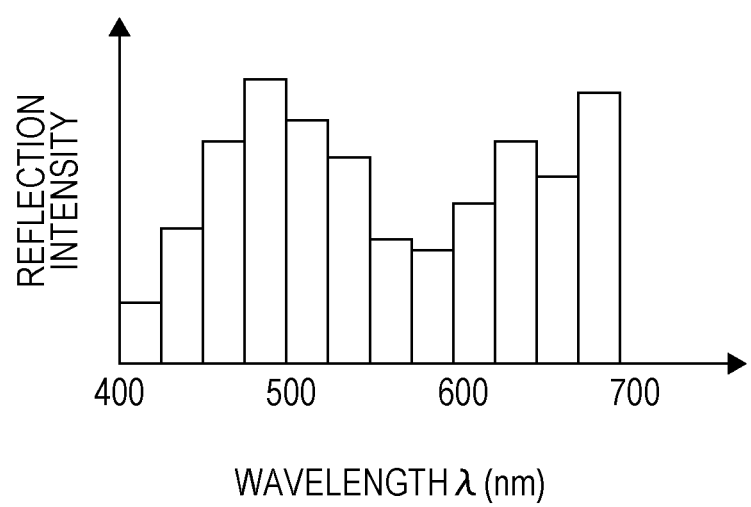
FIG. 29 is a graph that represents one example of the spectral reflection characteristic that is obtained by the correction simulation.

In the above correction simulation, the information that indicates the spectral reflection characteristic, which is schematically illustrated in FIG. 29 as one example, is created for each of the sample colors and for each of the spectral reflection characteristics indicated by the third characteristic information and is stored in the storage unit 33. Further, the main wavelengths are derived for each of the sample colors by the above correction simulation and stored in the storage unit 33.

Figure 30:
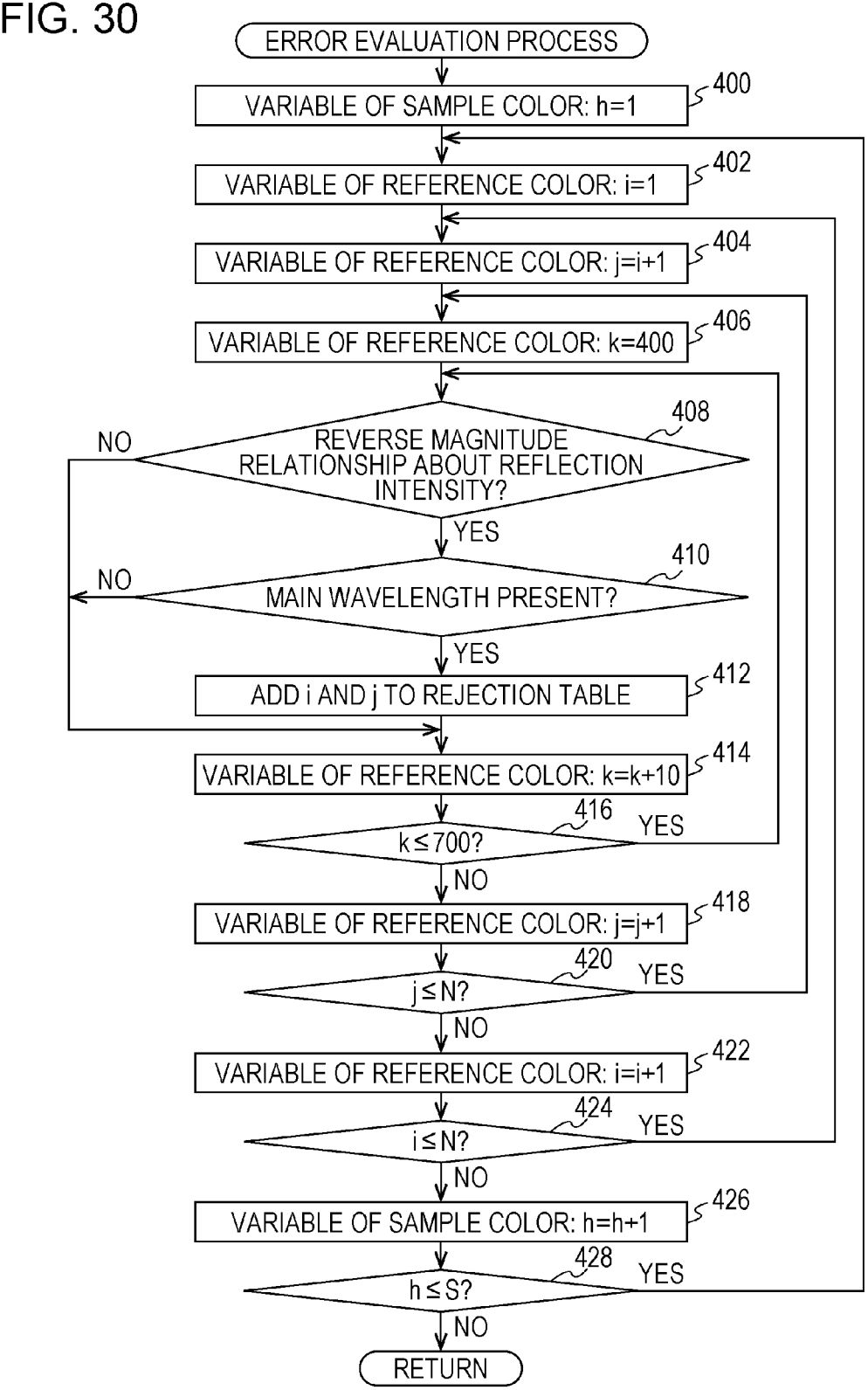
FIG. 30 is a flowchart that illustrates one example of the error evaluation process according to the second embodiment.

When the correction simulation is finished, the process moves to step 206B of the combination color correction accuracy evaluation process (see FIG. 27). In step 206B, the determination unit 11B performs an error evaluation process, which is illustrated in FIG. 30.

The error evaluation process according to the second embodiment is different compared to the error evaluation process according to the first embodiment (see FIG. 21 also) in the point that processes of steps 400, 426, and 428 are added. This error evaluation process is similar to the correction simulation (see FIG. 28 also) in the point that variable h in FIG. 30 is the variable for repeating the process for the number of the sample colors and the number S is the number of samples.

That is, in the error evaluation process according to the second embodiment, the error evaluation process according to the first embodiment is repeatedly executed for each of the individual sample colors. Accordingly, when the processes of above steps 402 to 428 are repeatedly executed, the sample colors that are previously not set as the process targets are used as the process target sample colors. In this case, in step 410, the main wavelengths that correspond to the sample color as the process target among the main wavelengths that are stored by the correction simulation are used as the main wavelengths. Further, in this case, in step 412, the derived reference color numbers are stored in the reference color rejection table while being associated with information for identifying the sample color (the color values themselves of the sample color in this embodiment). Accordingly, the reference color rejection table, which is illustrated in FIG. 31 as one example and includes information that indicates the reference color numbers of the reference colors to be removed (rejected) from the targets of selection of the reference colors by the selection unit 13B for each of the sample colors, is created in the memory 32.

When the error evaluation process is finished, the combination color correction accuracy evaluation process illustrated in FIG. 27 is finished, and the registration unit 12 performs a combination suitability registration process in step 102B in the color correction process illustrated in FIG. 26. The computer 30B according to the second embodiment performs a process of storing the reference color rejection table stored in the memory 32 by the combination color correction accuracy evaluation process in the reference color rejection table storage area 33C of the storage unit 33 without any change as the combination suitability registration process.

Figure 32:
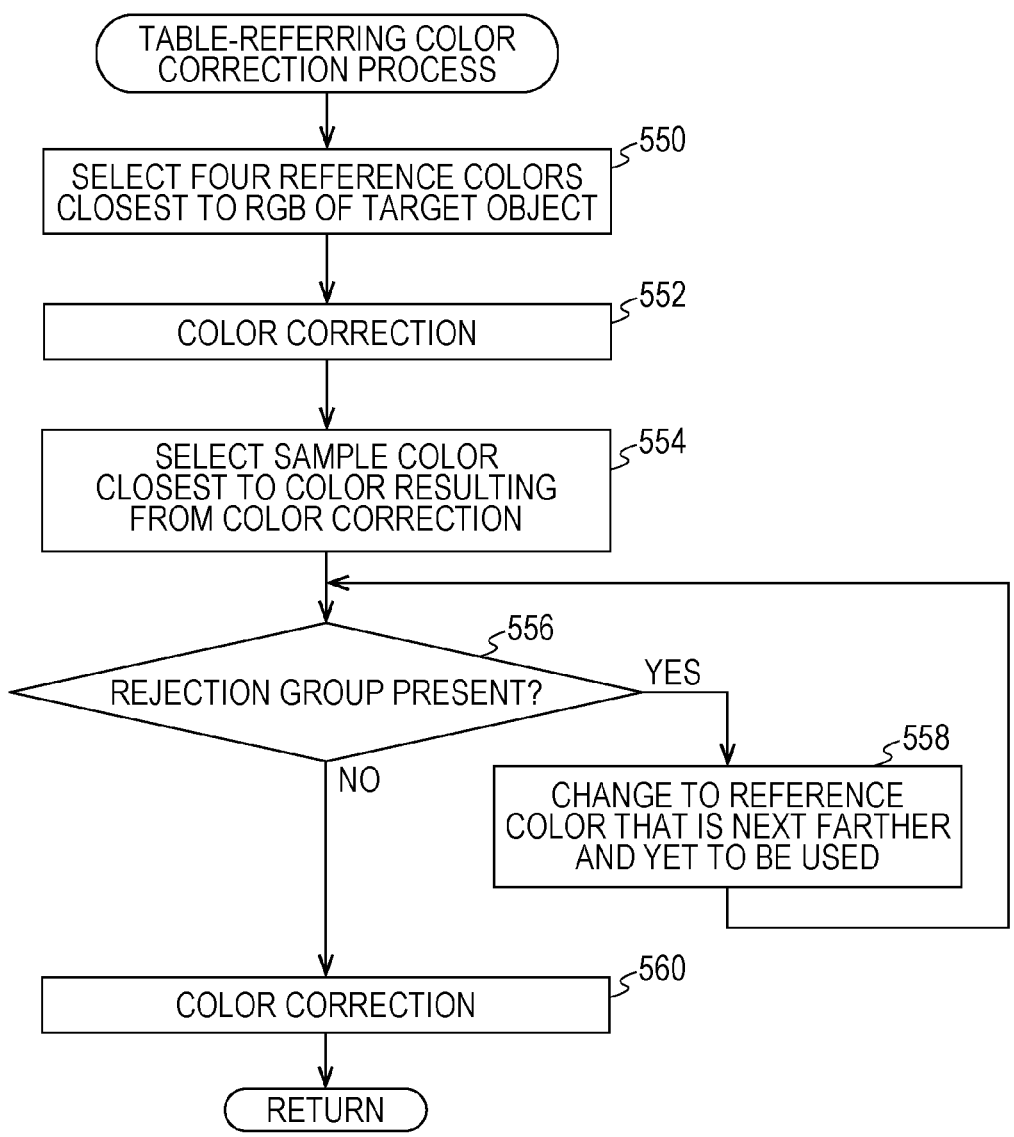
FIG. 32 is a flowchart that illustrates one example of the table-referring color correction process according to the second embodiment.

In step 104B, the color correction unit 21 performs a table-referring color correction process, which is illustrated in FIG. 32.

In step 550 of the table-referring color correction process, the selection unit 13B selects four reference colors in the order of closeness to the color values (r', g', b') of the target area of the target object in the RGB color space by a similar process to step 500 of the table-referring color correction process according to the first embodiment.

In step 552, the color correction unit 21 uses the selected four reference colors to perform the color correction to the color values of the target area of the target object by a similar process to step 506 of the table-referring color correction process according to the first embodiment.

In step 554, the selection unit 13B selects the sample color that is closest to the color values (r', g', b') of the target area of the target object, which result from the color correction, in the color space.

In step 556, the selection unit 13B determines whether or not the four reference colors selected by the process of step 550 include reference color combinations (rejection group) that are included in the reference color rejection table (see FIG. 31 also) and associated with the sample colors selected by the process of step 554. When the determination is affirmative, the process moves to step 558.

In step 558, the selection unit 13B is yet to select either one of the reference colors of the rejection group among the four reference colors selected by the process of step 550 until this point and changes that color to the reference color that is next farther from (r', g', b') in the RGB color space. The process thereafter returns to step 556. Further, when the determination is negative in step 556, the process moves to step 560.

In step 560, the color correction unit 21 uses the four reference colors (selection reference colors) that are confirmed by the above process to perform the color correction by a similar process to step 506 of the table-referring color correction process according to the first embodiment, thereafter finishes the table-referring color correction process, and finishes the color correction process illustrated in FIG. 26.

As described above in detail, in the second embodiment, the second characteristic information that indicates the spectral reflection characteristics of the color group to be the candidates of the reference colors and the third characteristic information that indicates the spectral reflection characteristics which indicate the principal components of the spectral reflection characteristics of the plural and mutually different same type colors of the target color (the sample color in this embodiment) are stored in advance. Further, in the second embodiment, the creation unit 17 creates the spectral reflection characteristics that reflect spectral sensitivity characteristics of the image-capturing unit that captures an image of the target color (the photographing unit 37 in this embodiment) and the spectral characteristic of a standard light source with respect to the spectral reflection characteristics that are indicated by the third characteristic information. Further, in the second embodiment, the identification unit 15B identifies the wavelengths that are mainly featured (main wavelengths) from the spectral reflection characteristic created by the creation unit 17. In addition, in the second embodiment, the determination unit 11B determines whether or not there is the wavelength that provides the reverse magnitude relationship about the spectral reflection characteristics indicated by the second characteristic information with respect to the wavelength identified by the identification unit 15B as the target. Thus, in the second embodiment, a more appropriate wavelength may selectively be used as the main wavelength.

Further, in the second embodiment, the rejection information (the reference color rejection table in this embodiment) is registered for each of the plural sample colors that possibly serve as the target color. Thus, more appropriate reference colors may easily be selected by referring to the rejection information.

In the above embodiment, a description is made about a case of employing the main wavelengths that are derived with respect to each of the plural sample colors that possibly serve as the target color. However, the derivation of the main wavelength is not limited to this. For example, similarly to the first embodiment, the main wavelengths that correspond to the target color itself may be derived and employed. In this case, as the prior information, information that indicates the plural spectral reflection characteristics which indicate the principal components of the spectral reflection characteristics of the plural same type colors of the target color is in advance stored as the third characteristic information. Then, the correction simulation is executed for the spectral reflection characteristics indicated by the third characteristic information as the targets.

[Third Embodiment]

A third embodiment of the disclosed technology will next be described. The same portions as the second embodiment are provided with the same reference characters, and descriptions thereof will be omitted as much as possible.

Figure 33:
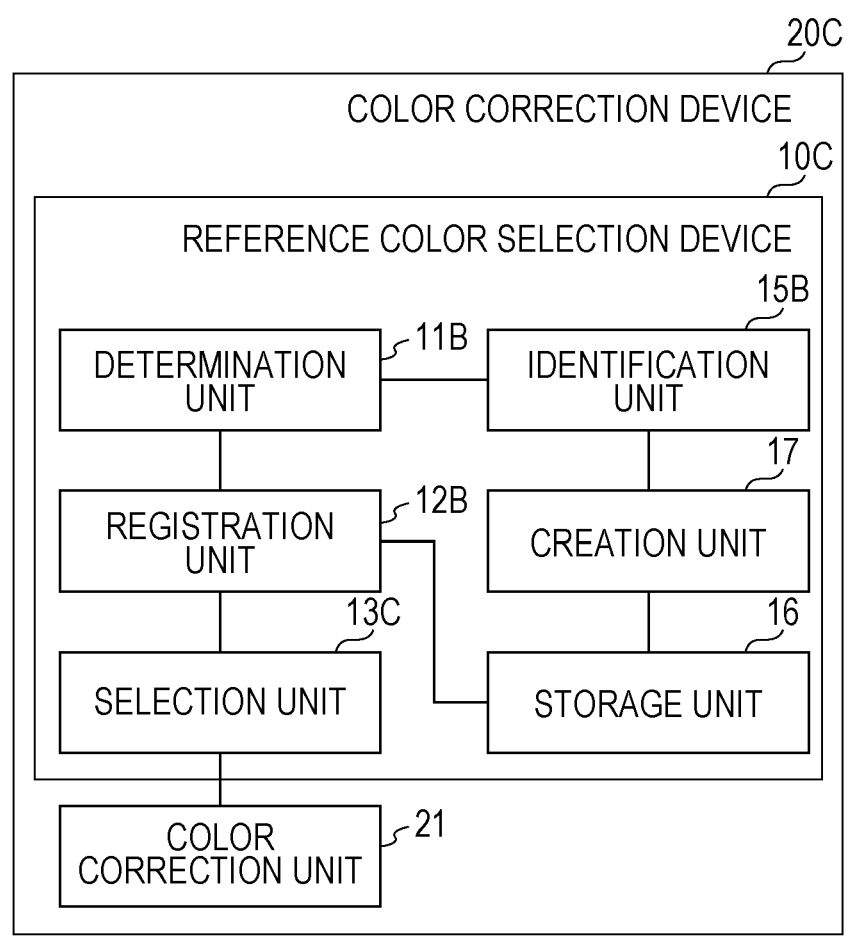
FIG. 33 is a function block diagram of a color correction device according to a third embodiment.

FIG. 33 illustrates a reference color selection device 10C and a color correction device 20C according to the third embodiment. As illustrated in FIG. 33, the color correction device 20C according to the third embodiment is different from the color correction device 20B according to the second embodiment in the point that the registration unit 12 is substituted by a registration unit 12B that performs different processes from the registration unit 12. Further, the color correction device 20C according to the third embodiment is different from the color correction device 20B according to the second embodiment in the point that the selection unit 13B is substituted by a selection unit 13C that performs different processes from the selection unit 13B.

That is, the registration unit 12 of the color correction device 20B according to the second embodiment performs the process of storing the reference color rejection table stored in the memory 32 by the combination color correction accuracy evaluation process in the reference color rejection table storage area 33C of the storage unit 33 without any change. On the other hand, the registration unit 12B of the color correction device 20C according to the third embodiment registers information that indicates the combinations of the reference colors except for the combinations of the reference colors indicated by the reference color rejection table as recommendation information (an optimal combination table which will be described below) that recommends the information as the reference colors to be used in the color correction. In this case, the registration unit 12B registers the information that indicates the recommended combination of the reference colors with respect to each of the above-described sample colors as the optimal combination table.

Then, the selection unit 13C of the color correction device 20C according to the third embodiment refers to the optimal combination table that is registered by the registration unit 12B and thereby selects the combination of the reference colors that are indicated by the optimal combination table as the reference colors to be used in the color correction. Further, the color correction unit 21 of the color correction device 20C according to the third embodiment performs the color correction for the target object by using the reference colors selected by the selection unit 13C (selection reference colors).

Figure 34:
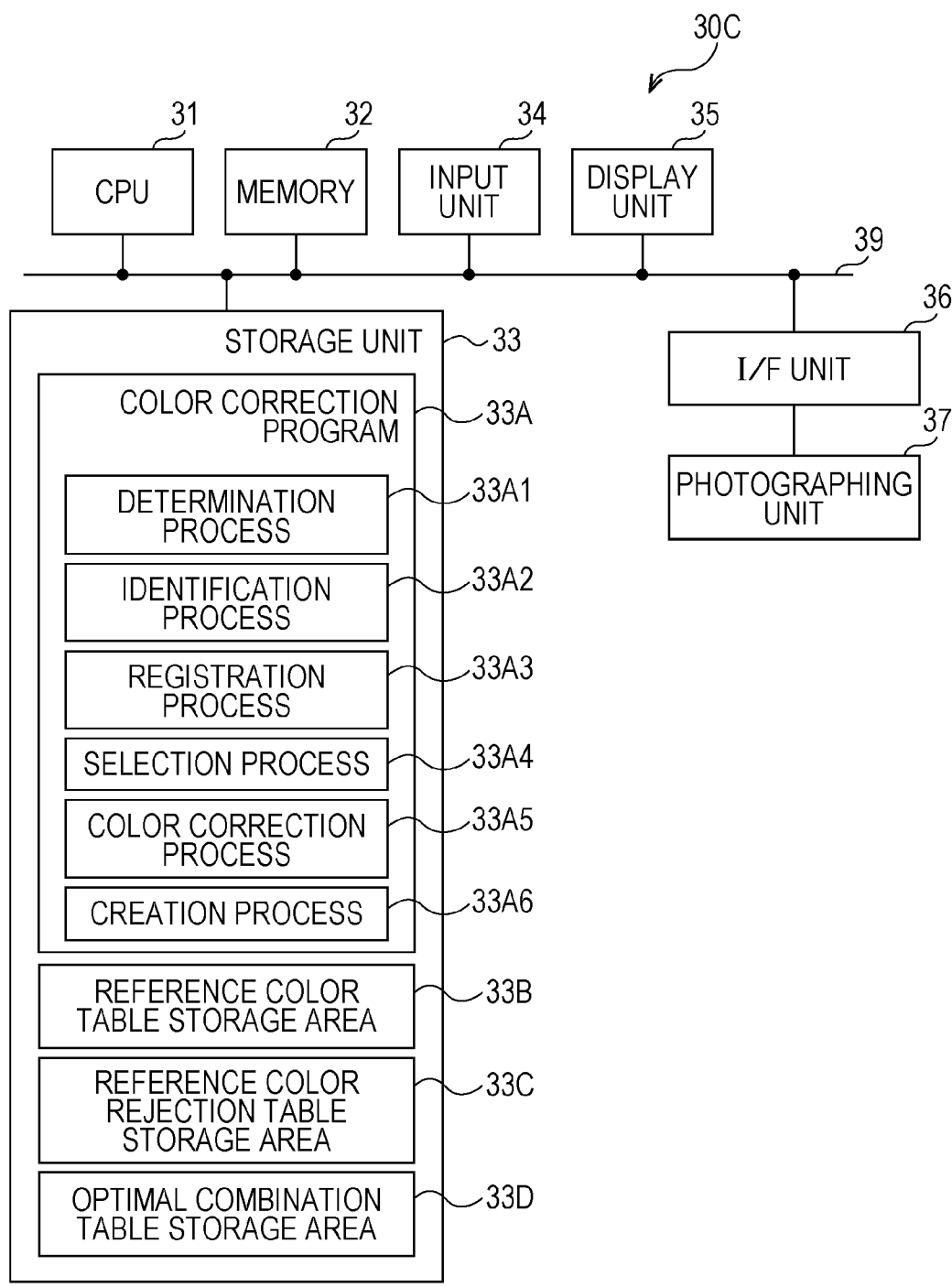
FIG. 34 is a block diagram that illustrates a schematic configuration of a computer according to the third embodiment.

The color correction device 20C according to the third embodiment may be realized by a computer 30C, which is illustrated in FIG. 34, for example. As illustrated in FIG. 34, the computer 30C according to the third embodiment is different from the computer 30B according to the second embodiment in the point that an optimal combination table storage area 33D is newly added to the storage unit 33.

The computer 30C may also be a smart terminal as the portable color correction device that is equipped with the function of the PC or the PDA. Further, the color correction device 20C may also be realized by a semiconductor integrated circuit, more particularly, an ASIC or the like, for example.

Actions of the third embodiment will next be described. In the third embodiment also, the computer 30C is caused to execute the color correction program 33A illustrated in FIG. 34, and the color correction process illustrated in FIG. 35 is thereby performed.

A user of the computer 30C according to the third embodiment stores prior information that is similar to the second embodiment in the storage unit 33 prior to execution of the color correction process. Similarly to the second embodiment, the user then photographs the target object with the color patch 80 by the photographing unit 37 of the computer 30C. Accordingly, the color image data obtained by photographing is stored in the storage unit 33.

Figure 35:
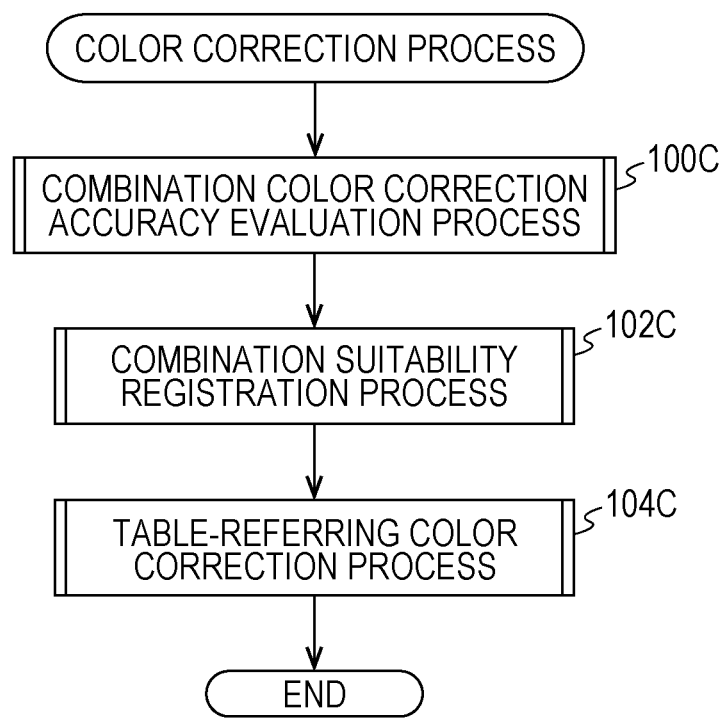
FIG. 35 is a flowchart that illustrates one example of a color correction process according to the third embodiment.

The computer 30C is caused to execute the color correction program 33A after the above prior preparation by the user, and the color correction process illustrated in FIG. 35 is thereby performed.

In step 100C of the color correction process, the color correction unit 21 performs the combination color correction accuracy evaluation process (see FIG. 27 also) by a similar process to step 100B of the color correction process according to the second embodiment.

Figure 36:
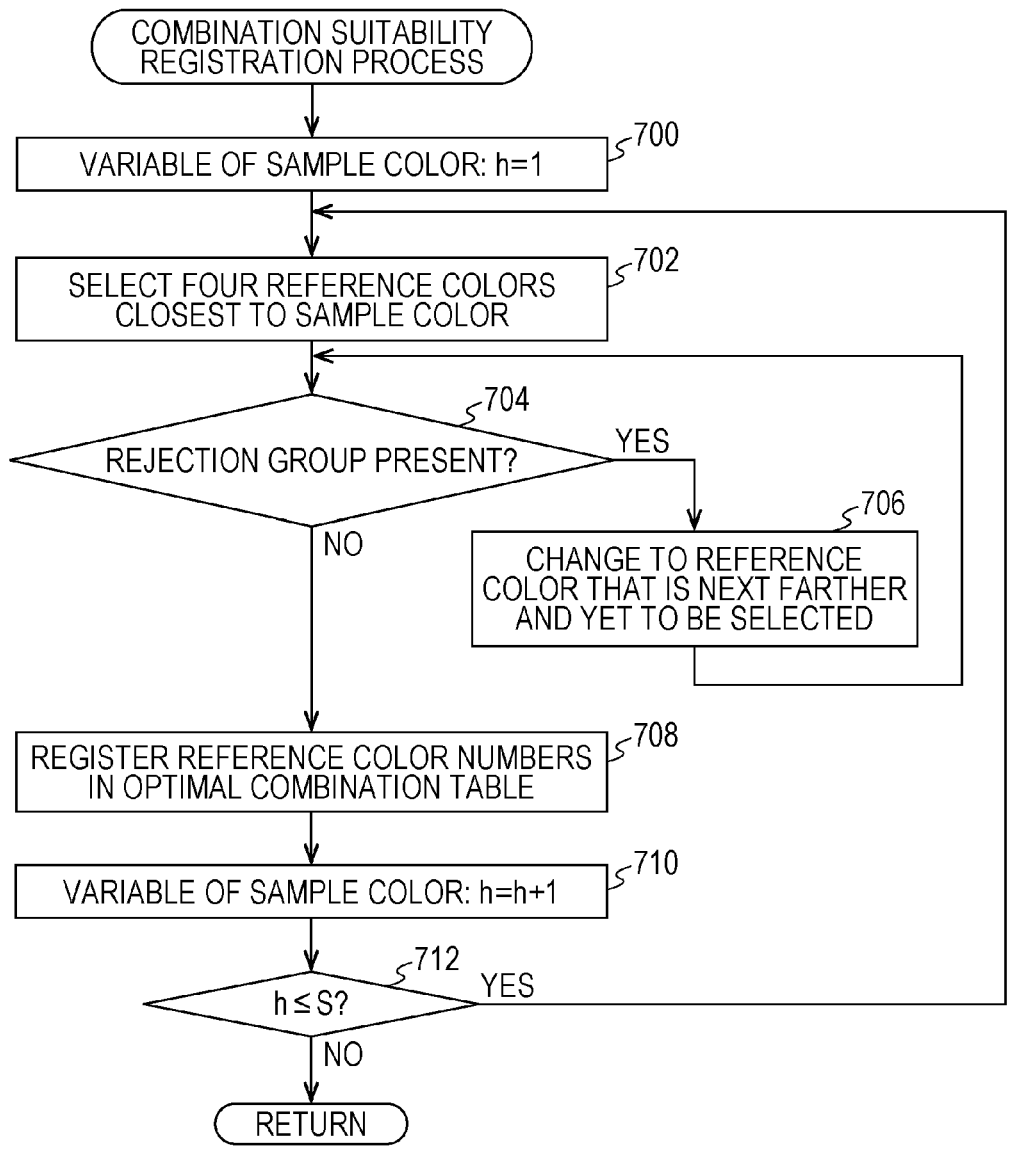
FIG. 36 is a flowchart that illustrates one example of a combination suitability registration process according to the third embodiment.

In step 102C, the registration unit 12B performs a combination suitability registration process, which is illustrated in FIG. 36.

In step 700 of the combination suitability registration process, the registration unit 12B substitutes 1 for variable h. In step 702, the registration unit 12B selects four reference colors in the order of closeness to any one of the sample colors (hereinafter referred to as "process target sample color") in the RGB color space.

In step 704, the registration unit 12B determines whether or not the four reference colors selected by the process of step 702 include reference color combinations (rejection group) that are included in the reference color rejection table (see FIG. 37 also) and associated with the process target sample color. When the determination is affirmative, the process moves to step 706.

In step 706, the registration unit 12B is yet to select either one of the reference colors of the rejection group among the four reference colors selected by the process of step 702 until this point and changes that color to the reference color that is next farther from the process target sample color in the RGB color space. The process thereafter returns to step 704. Further, when the determination is negative in above step 704, the process moves to step 708.

In step 708, the registration unit 12B associates the combination of the four reference colors that is confirmed by the above process with the information that indicates the process target sample color and stores the combination as optimal reference color numbers in the optimal combination table in the optimal combination table storage area 33D in the storage unit 33.

In step 710, the registration unit 12B increases the value of variable h only by 1. In step 712, the registration unit 12B determines whether or not the value of variable h is the number S of the sample colors or less. Here, when the determination is affirmative, the process returns to step 702. On the other hand, when the determination is negative, the combination suitability registration process is finished.

When the processes of above steps 702 to 712 are repeatedly executed, the registration unit 12B employs the sample colors that are previously not set as the process targets as the process target sample colors.

Figure 37:
FIG. 37 is a chart that illustrates one example of an optimal combination table according to the third embodiment.

The optimal combination table, which is schematically illustrated in FIG. 37 as one example, is created by the above combination suitability registration process and stored in the optimal combination table storage area 33D in the storage unit 33. As illustrated in FIG. 37, in the third embodiment, the color values themselves of the process target sample color are employed as the information that indicates the process target sample color.

Figure 38:
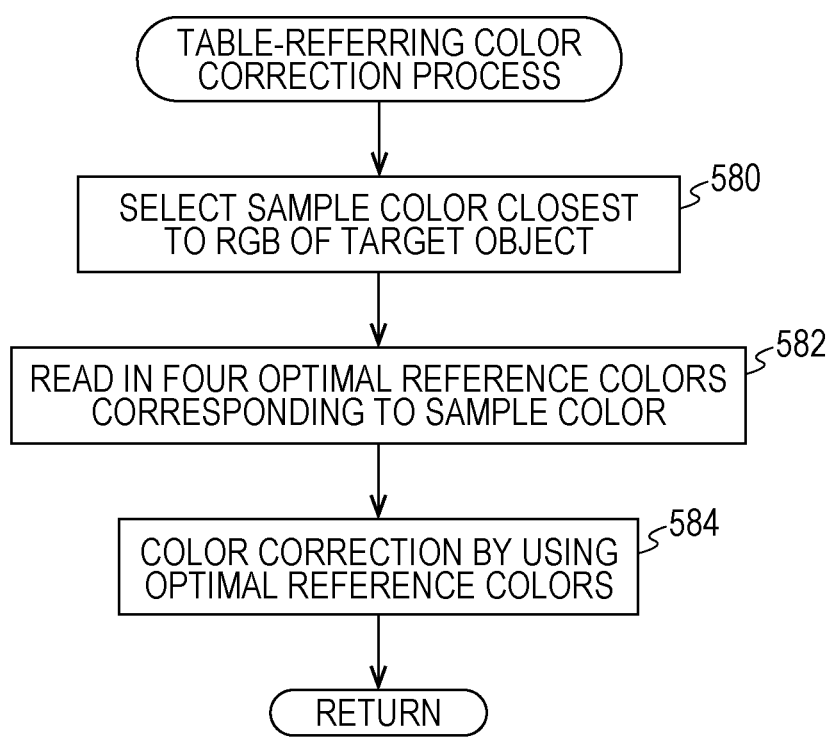
FIG. 38 is a flowchart that illustrates one example of the table-referring color correction process according to the third embodiment.

When the combination suitability registration process is finished, the color correction unit 21 performs a table-referring color correction process illustrated in FIG. 38 in step 104C of the color correction process illustrated in FIG. 35.

In step 580 of the table-referring color correction process, the selection unit 13C selects the closest sample color to the color values (r', g', b') of the target area of the target object in the RGB color space by a similar process to step 550 of the table-referring color correction process according to the second embodiment.

In step 582, the selection unit 13C reads in the optimal reference color numbers that correspond to the selected sample color from the optimal combination table. In step 584, the color correction unit 21 uses the reference colors that are represented by the read-in optimal reference color numbers to perform the color correction for the target area of the target object by a similar process to step 560 of the table-referring color correction process according to the second embodiment. When the color correction is finished, the table-referring color correction process is finished, and the color correction process illustrated in FIG. 35 is also finished.

As described above in detail, in the third embodiment, the information that indicates the combinations of the reference colors except for the combinations of the first candidate color and the second candidate color which are indicated by the rejection information (the reference color rejection table in this embodiment) is further registered as the recommendation information (the optimal combination table in this embodiment) that recommends the information as the reference colors to be used in the color correction. In addition, in the third embodiment, the registered recommendation information is referred to, and the combination of the reference colors that are indicated by the recommendation information is selected as the reference colors to be actually used in the color correction. Thus, in the third embodiment, the preferable reference colors may easily be selected by using the recommendation information.

Further, in the third embodiment, the recommendation information is registered for each of the plural sample colors that possibly serve as the target color. Thus, more appropriate reference colors may easily be selected by referring to the recommendation information.

Figure 39:
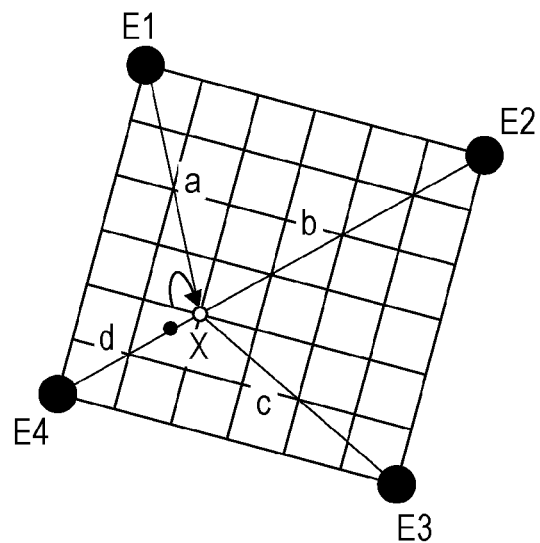
FIG. 39 is a schematic diagram that illustrates another example of the color correction process.

In the above embodiments, as the color correction, the case that employs the color correction illustrated in FIG. 5 as one example is described. However, the color correction is not limited to this. For example, color correction illustrated in FIG. 39 as one example may be performed.

In this color correction, the inside of the color space of selected four reference colors E1 to E4 is divided in a lattice manner, thereafter a target color X is approximated to the closest lattice point, and the position of the target color X is replaced by the lattice point.

Next, the color values (R, G, B) of the target color X resulting from the color correction are calculated by the following equations (11) to (13) so that the weighting coefficients are set larger for the closer reference colors from the approximated point in the color space. In equations (11) to (13), the term a represents the distance between the reference color E1 and the approximated target color X, the term b represents the distance between the reference color E2 and the approximated target color X, the term c represents the distance between the reference color E3 and the approximated target color X, and the term d represents the distance between the reference color E4 and the approximated target color X. Further, the terms E1(R), E2(R), E3(R), and E4(R) in equation (11) respectively represent the R color values of the reference colors E1 to E4. Similarly, the terms E1(G), E2(G), E3(G), and E4(G) in equation (12) respectively represent the G color values of the reference colors E1 to E4. The terms E1(B), E2(B), E3(B), and E4(B) in equation (13) respectively represent the B color values of the reference colors E1 to E4.

$$R = \frac{c}{a+b+c+d} \times E1(R) + \frac{d}{a+b+c+d} \times E2(R) + \frac{a}{a+b+c+d} \times E3(R) + \frac{b}{a+b+c+d} \times E4(R) \quad (11)$$

$$G = \frac{c}{a+b+c+d} \times E1(G) + \frac{d}{a+b+c+d} \times E2(G) + \frac{a}{a+b+c+d} \times E3(G) + \frac{b}{a+b+c+d} \times E4(G) \quad (12)$$

$$B = \frac{c}{a+b+c+d} \times E1(B) + \frac{d}{a+b+c+d} \times E2(B) + \frac{a}{a+b+c+d} \times E3(B) + \frac{b}{a+b+c+d} \times E4(B) \quad (13)$$

Figure 40:
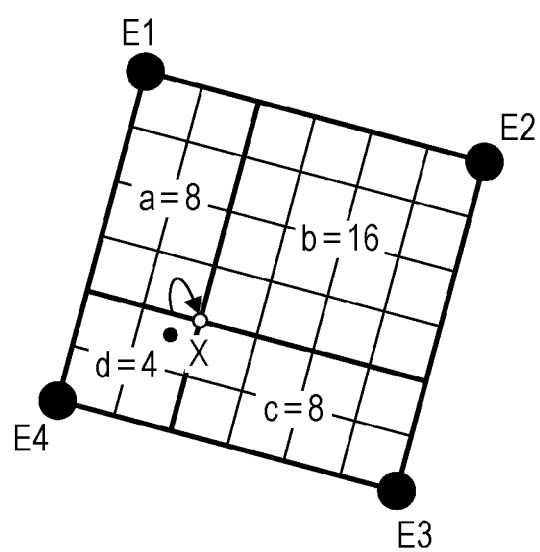
FIG. 40 is a schematic diagram that illustrates still another example of the color correction process.

Further, as illustrated in FIG. 40 as one example, the color correction may be performed by equations (11) to (13) by using the areas of the lattices (the number of lattices in the example illustrated in FIG. 40) instead of the distances as the weighting coefficients. In the example illustrated in FIG. 40, distance a is replaced by area a (=8), distance b is replaced by area b (=16), distance c is replaced by area c (=8), and distance d is replaced by area d (=4).

Although the computation load increases as the width of the lattice is set narrower in those kinds of color corrections, the color correction may be performed with high accuracy.

Further, although not mentioned in the above embodiments, there may be a case where the four reference colors may not be obtained by the rejection of the reference colors by using the reference color rejection table in the table-referring color correction process. In such a case, unfeasibility of obtaining the four reference colors, unfeasibility of the color correction due to that, or the like may be reported via the display unit 35.

Further, in the above embodiments, a description is made about a case where four reference colors are used as the reference colors to be used in the color correction. However, the number of reference colors is not limited to this. For example, the plural number other than four may be used as the number of the reference colors.

Further, in the above embodiments, a description is made about a case where the disclosed technology is applied to a device that performs color correction. However, application is not limited to this. For example, the disclosed technology may be applied to a device that measures colors. In such a case, the color values resulting from the color correction indicate the measured color values.

Further, in the above embodiments, a description is made about a case where the RGB color space is employed as the target color space. However, the color space is not limited to this. For example, another color space such as the L*a*b* color space or the XYZ color space may be used as the target.

Figure 41:
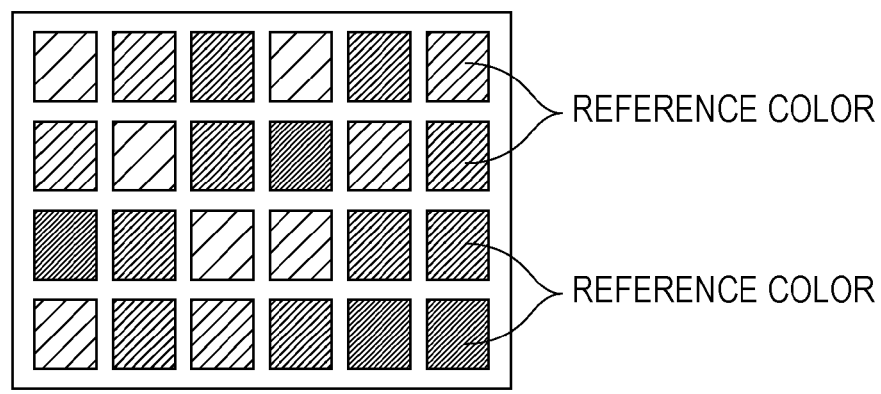
FIG. 41 is an external view that illustrates another example of the color patch.

Further, in the above embodiments, as illustrated in FIG. 6 as one example, a description is made about a case where the patch portion provided in the color patch is in a circular shape. However, the patch portion is not limited to this. As illustrated in FIG. 41 as one example, a patch portion in a rectangular shape as the whole, in which rectangles of plural reference colors are arranged in a matrix manner, may be used.

Further, in the above embodiments, a description is made about a case where values of the spectral characteristic such as the spectral reflection intensity and the spectral reflectance are employed as the color intensity. However, the color intensity is not limited to this. For example, instead of those spectral characteristics, lightness L in the L*a*b* color space may be employed as the color intensity. Similarly, the values that indicate the gray levels of colors in various color spaces such as the RGB color space and the XYZ color space may be employed as the color intensity.

Further, in the above embodiments, descriptions are made about embodiments in which the color correction program 33A is in advance stored (installed) in the storage unit 33 of the computers 30A to 30C. However, usage of the color correction program 33A is not limited to this. For example, the color correction program 33A may be downloaded from an external device to the storage unit 33 via a network, which is not illustrated, or may be provided in a state where the color correction program 33A is recorded in a storage medium such as a CD-ROM or a DVD-ROM.

All documents, patent applications, and technical standards described herein are incorporated herein by reference to the same extent as if incorporation by reference of individual documents, patent applications, and technical standards were specifically and individually described.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A reference color selection device comprising:
a memory; and
a hardware processor coupled to the memory and configured to
compare a first magnitude of a first candidate color and a second magnitude of a second candidate color with respect to plural wavelengths and determine whether there is a wavelength that provides a reverse magnitude relationship between the first magnitude and the second magnitude reverse to a magnitude relationship at other wavelengths, the first candidate color and the second candidate color being included in a color group to be candidates of plural reference colors that are used in color correction of a target color, the color correction being performed by an interpolation process by using the plural reference colors; and
select the color group as the reference colors when there is not a combination of the first candidate color and the second candidate color about which it is determined there is the wavelength that provides the reverse magnitude relationship in the color group to be the candidates of the reference colors.

2. The reference color selection device according to claim 1, wherein the hardware processor is further configured to:
store, in advance, first characteristic information that indicates spectral reflection characteristics of same type colors as the target color and second characteristic information that indicates the spectral reflection characteristics of the color group to be the candidates of the reference colors,
identify a wavelength that is mainly featured from the spectral reflection characteristic of the same type color that is indicated by the first characteristic information, and
determine whether there is the wavelength that provides the reverse magnitude relationship about the spectral reflection characteristics that are indicated by the second characteristic information with respect to the wavelength that is identified as a target.

3. The reference color selection device according to claim 1, wherein the hardware processor is further configured to:
store, in advance, second characteristic information that indicates spectral reflection characteristics of the color group to be the candidates of the reference colors and third characteristic information that indicates the spectral reflection characteristics which indicate main components of the spectral reflection characteristics of plural and mutually different same type colors of the target color,
create spectral reflection characteristics that reflect spectral sensitivity characteristics of an image-capturing unit that captures an image of the target color and a spectral characteristic of a standard light source with respect to the spectral reflection characteristics that are indicated by the third characteristic information,
identify a wavelength that is mainly featured from the spectral reflection characteristic that is created, and
determine whether there is the wavelength that provides the reverse magnitude relationship about the spectral reflection characteristics that are indicated by the second characteristic information with respect to the wavelength that is identified as a target.

4. The reference color selection device according to claim 1, wherein the hardware processor is further configured to:
register information that indicates the combination of the first candidate color and the second candidate color as the target of a determination as rejection information that rejects the combination from the reference colors to be used in the color correction in a case where it is determined that there is the wavelength that provides the reverse magnitude relationship,
refer to the rejection information that is registered and select the color group to be the candidates of the reference colors in which there is not the combination of the first candidate color and the second candidate color that is indicated by the rejection information as the reference colors.

5. The reference color selection device according to claim 4, wherein the hardware processor is further configured to
register information that indicates combinations of colors of a color group to be the candidates except for the combination of the first candidate color and the second candidate color which is indicated by the rejection information as the recommendation information that recommends the information as the reference colors to be used in the color correction, and
refer to the recommendation information that is registered and select the combinations of the colors of the color group to be the candidates that are indicated by the recommendation information as the reference colors.

6. The reference color selection device according to claim 2,
wherein the hardware processor is further configured to identify wavelengths from the wavelength with the highest spectral reflection intensity to the wavelength of a prescribed number in order in the spectral reflection characteristic of the same type color as the wavelengths that are mainly featured.

7. The reference color selection device according to claim 2,
wherein the hardware processor is further configured to identify wavelengths whose spectral reflection intensities are a predetermined threshold or higher in the spectral reflection characteristic of the same type color as the wavelengths that are mainly featured.

8. The reference color selection device according to claim 4,
wherein the hardware processor is further configured to register the rejection information such that the rejection information corresponds to each of plural sample colors that possibly serve as the target color.

9. The reference color selection device according to claim 5,
wherein the hardware processor is further configured to register the recommendation information such that the recommendation information corresponds to each of plural sample colors that possibly serve as the target color.

10. A color correction device comprising:
a memory; and
a hardware processor coupled to the memory and configured to compare a first magnitude of a first candidate color and a second magnitude of a second candidate color with respect to plural wavelengths and determine whether there is a wavelength that provides a reverse magnitude relationship between the first magnitude and the second magnitude reverse to a magnitude relationship at other wavelengths, the first candidate color and the second candidate color being included in a color group to be candidates of plural reference colors that are used in color correction of a target color, the color correction being performed by an interpolation process by using the plural reference colors; and select the color group as the reference colors when there is not a combination of the first candidate color and the second candidate color about which it is determined that there is the wavelength that provides the reverse magnitude relationship in the color group to be the candidates of the reference colors; and perform the color correction to the target color by the interpolation process by using the reference colors that are selected.

11. The color correction device according to claim 10, wherein the hardware processor is further configured to perform the color correction to the target color by the interpolation process based on color information of the colors of the color group and the target color that is obtained by photographing a color patch in which the colors of the color group to be the candidates of the reference colors are arranged and a target object as the target color and color information that indicates original colors of the colors of the color group.

12. The color correction device according to claim 11, wherein the hardware processor is further configured to set $(r_i', g_i', b_i')$, i being 0, 1, 2, or 3, as the color information that is obtained by photographing the reference colors that are selected, sets $(r', g', b')$ as the color information of the target color that is obtained by photographing, calculates weighting coefficients $w_i$, to be conditions of equation (3) by equation (4), and set $(r_i, g_i, b_i)$, i being 0, 1, 2, or 3, as the color information that indicates the original colors of the reference colors that are selected, substitutes calculated weighting coefficient $w_i$, into equation (5), and derives color information $(r, g, b)$ that results from the color correction to the target color.

13. A reference color selection method that causes a computer to execute a process comprising:

comparing a first magnitude of a first candidate color and a second magnitude of a second candidate color with respect to plural wavelengths and determining whether or not there is any wavelength that provides a reverse magnitude relationship between the first and second magnitudes reverse to a magnitude relationship at other wavelengths, the first and second candidate colors being included in a color group to be candidates of plural reference colors that are used in color correction of a target color, the color correction being performed by an interpolation process by using the plural reference colors; and selecting the color group as the reference colors when there is not a combination of the first candidate color and the second candidate color about which the determininq determines that there is the wavelength that provides the reverse magnitude relationship in the color group to be the candidates of the reference colors.

14. The reference color selection method according to claim 13, further comprising:

identifying a wavelength that is mainly featured from a spectral reflection characteristic of a same type color that is indicated by first characteristic information that indicates spectral reflection characteristics of the same type colors of the target color; and determining whether or not there is the wavelength that provides the reverse magnitude relationship about the spectral reflection characteristics that are indicated by second characteristic information that indicates the spectral reflection characteristics of the color group to be the candidates of the reference colors with respect to the identified wavelength as a target.

15. The reference color selection method according to claim 13, further comprising:

creating spectral reflection characteristics that reflect spectral sensitivity characteristics of an image-capturing unit that captures an image of the target color and a spectral characteristic of a standard light source with respect to spectral reflection characteristics that are indicated by third characteristic information that indicates spectral reflection characteristics that indicate main components of spectral reflection characteristics of plural and mutually different same type colors of the target color;

identifying a wavelength that is mainly featured from the created spectral reflection characteristic; and determining whether or not there is the wavelength that provides the reverse magnitude relationship about the spectral reflection characteristics that are indicated by second characteristic information that indicates the spectral reflection characteristics of the color group to be the candidates of the reference colors with respect to the identified wavelength identified as a target.

16. The reference color selection method according to claim 13, further comprising:

registering information that indicates the combination of the first candidate color and the second candidate color as a target of a determination as rejection information that rejects the combination from the reference colors to be used in the color correction in a case where a determination is made that there is the wavelength that provides the reverse magnitude relationship; and referring to the registered rejection information to select the color group to be the candidates of the reference colors in which there is not the combination of the first candidate color and the second candidate color that is indicated by the rejection information as the reference colors.

17. The reference color selection method according to claim 16, further comprising:

registering further information that indicates combinations of colors of the color group to be the candidates except for the combination of the first candidate color and the second candidate color which is indicated by the rejection information as the recommendation information that recommends the information as the reference colors to be used in the color correction; and referring to the registered recommendation information to select the combinations of the colors of the color group to be the candidates that are indicated by the recommendation information as the reference colors.

18. The reference color selection method according to claim 14, further comprising:

identifying wavelengths from the wavelength with the highest spectral reflection intensity to the wavelength of a prescribed number in order in the spectral reflection characteristic of the same type color as the wavelengths that are mainly featured.

19. The reference color selection method according to claim 14, further comprising:

identifying wavelengths whose spectral reflection intensities are a predetermined threshold or higher in the spectral reflection characteristic of the same type color as the wavelengths that are mainly featured.

20. The reference color selection method according to claim 16, further comprising:

registering the rejection information such that the rejection information corresponds to each of plural sample colors that possibly serve as the target color.

* * * * *